(12) United States Patent
Zhang et al.

(10) Patent No.: US 10,451,853 B2
(45) Date of Patent: Oct. 22, 2019

(54) OPTICAL IMAGING LENS

(71) Applicant: GENIUS ELECTRONIC OPTICAL CO., LTD., Taichung (TW)

(72) Inventors: Jiayuan Zhang, Xiamen (CN); Binwei Zhang, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 212 days.

(21) Appl. No.: 15/653,509

(22) Filed: Jul. 18, 2017

(65) Prior Publication Data

US 2018/0356615 A1   Dec. 13, 2018

(30) Foreign Application Priority Data

Jun. 8, 2017 (CN) .......................... 2017 1 0426868

(51) Int. Cl.
| | |
|---|---|
| *G02B 13/02* | (2006.01) |
| *G02B 13/00* | (2006.01) |
| *G02B 13/18* | (2006.01) |
| *G02B 13/06* | (2006.01) |
| *G02B 3/04* | (2006.01) |
| *H04N 5/225* | (2006.01) |

(52) U.S. Cl.
CPC ............. *G02B 13/02* (2013.01); *G02B 3/04* (2013.01); *G02B 13/0045* (2013.01); *G02B 13/06* (2013.01); *G02B 13/18* (2013.01); *G02B 13/001* (2013.01); *H04N 5/2254* (2013.01)

(58) Field of Classification Search
CPC .. G02B 13/00; G02B 13/001; G02B 13/0015; G02B 13/002; G02B 13/0045; G02B 13/04; G02B 13/06; G02B 13/18; G02B 3/04; G02B 5/005; G02B 5/208; G02B 7/021; G02B 9/00; G02B 9/62; G02B 9/64; G02B 1/007; G02B 1/04; G02B 27/0025; H04N 5/2252; H04N 5/2253; H04N 5/2254; H04N 5/335
USPC ....... 359/642, 682, 692, 708, 713, 738–739, 359/750–758; 348/294, 360
See application file for complete search history.

(56) References Cited

U.S. PATENT DOCUMENTS

| | | | | |
|---|---|---|---|---|
| 2009/0073577 A1* | 3/2009 | Jung | ...................... | G02B 13/06 359/717 |
| 2012/0170132 A1* | 7/2012 | Liang | ..................... | G02B 13/16 359/649 |

* cited by examiner

*Primary Examiner* — Marin Pichler
*Assistant Examiner* — Ibrahima Diedhiou
(74) *Attorney, Agent, or Firm* — Huffman Law Group, P.C.; James W. Huffman

(57) ABSTRACT

Present embodiments provide for optical imaging lenses. An optical imaging lens may comprise six lens elements positioned sequentially from an object side to an image side. By controlling the convex or concave shape of the surfaces of the lens elements and designing parameters satisfying at least one inequality, the optical imaging lens may exhibit better optical characteristics, the total length of the optical imaging lens may be shortened and the performance of athermalization may be improved.

19 Claims, 43 Drawing Sheets

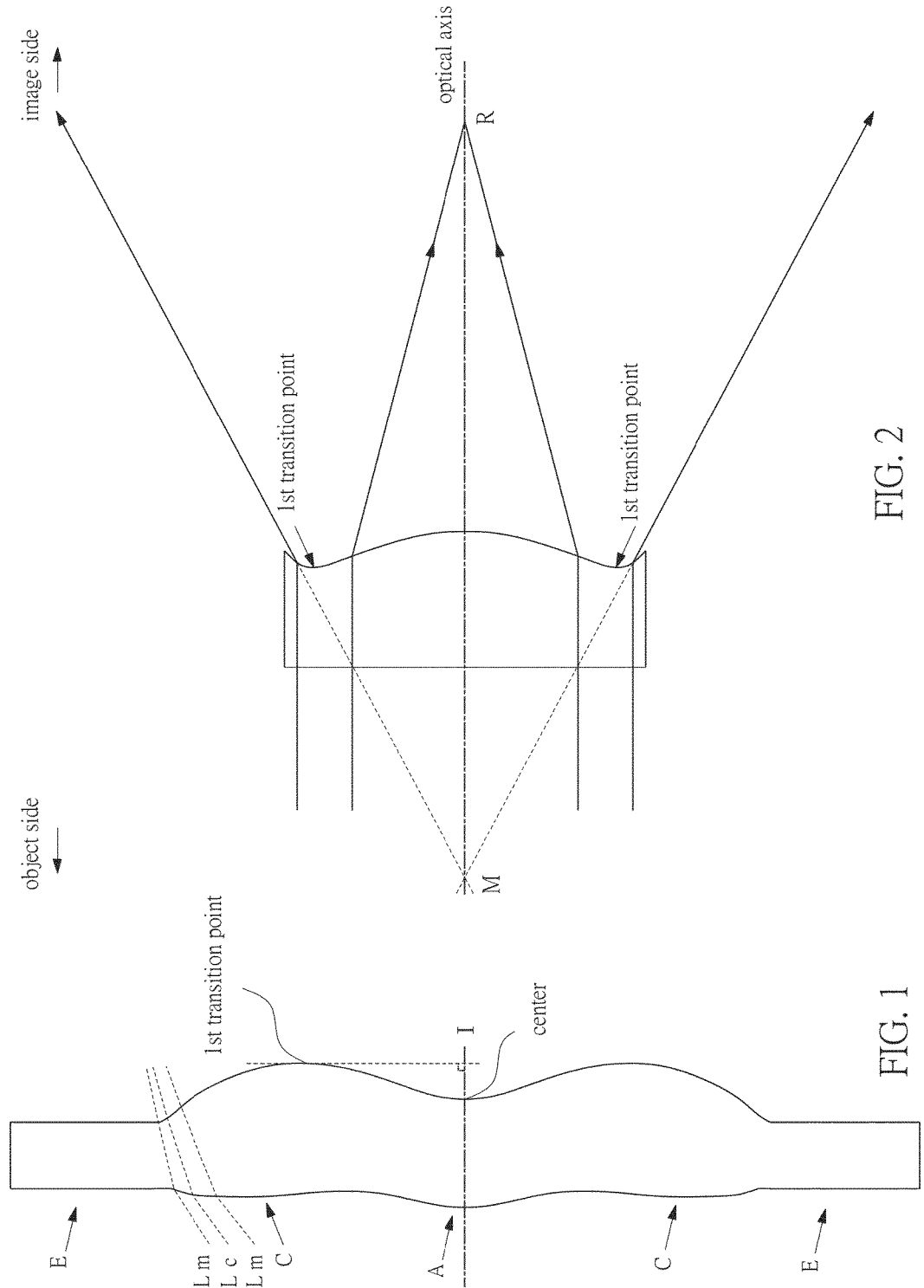

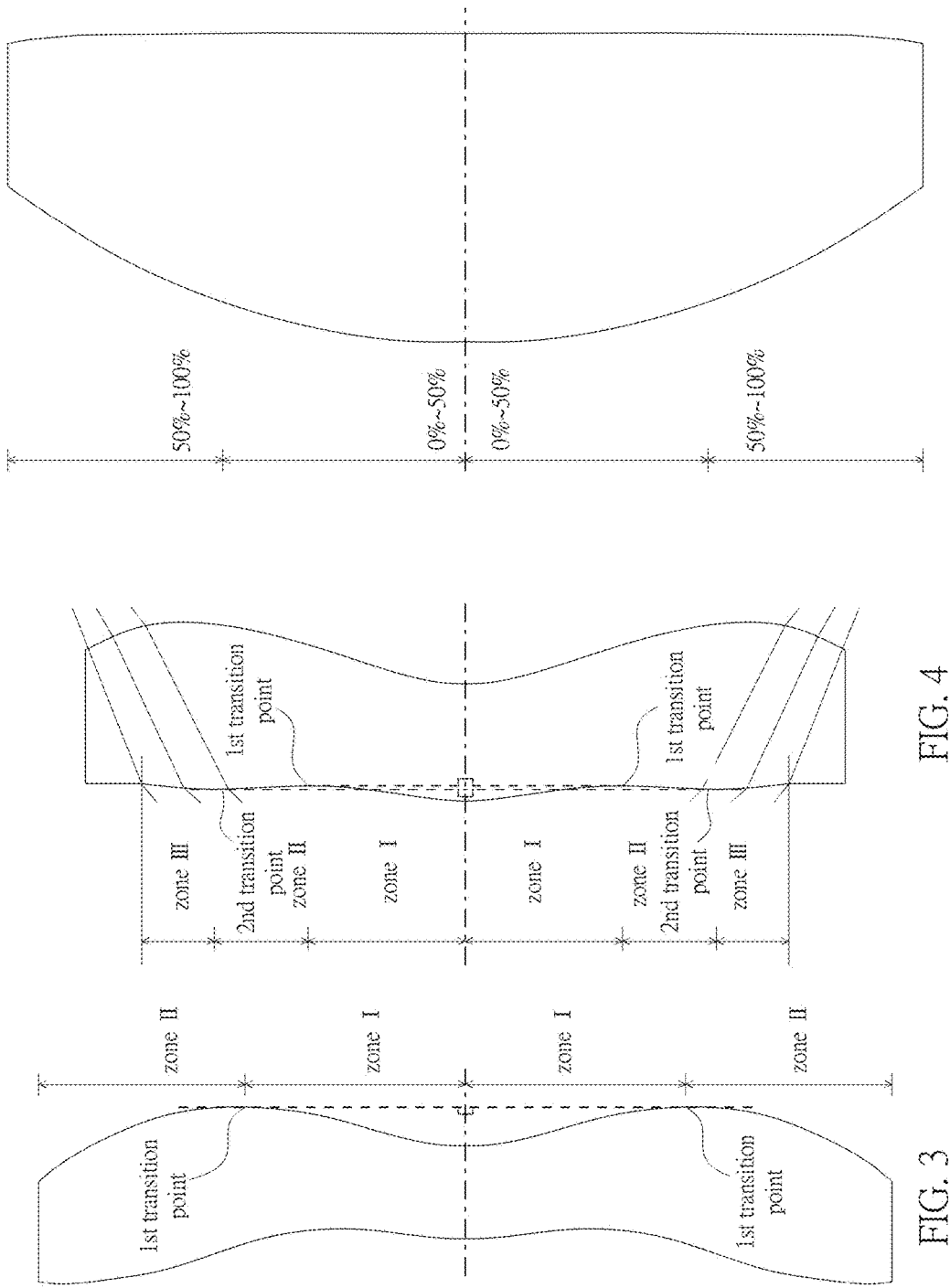

| Effective focal length (EFL) = 2.409 mm, HFOV (Half field of view) = 87.000 deg., TTL = 24.058 mm, Image height = 3.576 mm, Fno = 2.40 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 111 | 1st lens element | 20.945 | 3.801(T1) | 1.744(n1) | 44.904(v1) | -7.745(f1) | Glass |
| 112 | | 4.182 | 3.128(G12) | | | | |
| 121 | 2nd lens element | -49.585 | 1.180(T2) | 1.545(n2) | 55.987(v2) | -4.588(f2) | Plastic |
| 122 | | 2.662 | 1.748(G23) | | | | |
| 131 | 3rd lens element | 5.477 | 4.130(T3) | 1.689(n3) | 31.161(v3) | 5.423(f3) | Glass |
| 132 | | -8.275 | 0.457(G34-TA) | | | | |
| 100 | Aperture stop | INFINITY | 0.509(TA) | | | | |
| 141 | 4th lens element | 30.296 | 1.258(T4) | 1.545(n4) | 55.987(v4) | 5.894(f4) | Plastic |
| 142 | | -3.550 | 0.071(G45) | | | | |
| 151 | 5th lens element | -8.976 | 0.688(T5) | 1.642(n5) | 22.409(v5) | -3.468(f5) | Plastic |
| 152 | | 3.084 | 0.116(G56) | | | | |
| 161 | 6th lens element | 3.835 | 1.709(T6) | 1.545(n6) | 55.987(v6) | 4.081(f6) | Plastic |
| 162 | | -4.486 | 3.700(G6F) | | | | |
| 171 | IR cut filter | INFINITY | 0.300(TF) | 1.517(nf) | 64.167(vf) | | |
| 172 | | INFINITY | 1.262(GFP) | | | | |
| 180 | Image plane | INFINITY | 0.000 | | | | |

FIG. 8

| Aspherical parameters | | | | |
|---|---|---|---|---|
| Surface # | 121 | 122 | 141 | 142 |
| K | 0.000000E+00 | -5.049249E-01 | 0.000000E+00 | -5.452814E-01 |
| $a_4$ | 9.554310E-04 | 4.317744E-03 | -5.017827E-03 | -6.590089E-03 |
| $a_6$ | -1.138130E-04 | 1.230820E-04 | -2.892680E-04 | -6.160218E-03 |
| $a_8$ | 4.561000E-06 | -6.879000E-06 | -1.532530E-04 | 1.641606E-03 |
| $a_{10}$ | -7.200000E-08 | 1.608000E-06 | -2.818750E-04 | -2.737900E-04 |
| Surface # | 151 | 152 | 161 | 162 |
| K | 2.675372E+00 | 0.000000E+00 | 0.000000E+00 | -3.098198E+00 |
| $a_4$ | -1.936053E-02 | -2.656881E-02 | -1.479869E-02 | -6.738253E-03 |
| $a_6$ | -5.043275E-03 | 1.101395E-03 | 3.056150E-04 | 6.111400E-05 |
| $a_8$ | 1.492845E-03 | 1.838420E-04 | 8.274100E-05 | 5.693400E-05 |
| $a_{10}$ | -7.004700E-05 | -2.432100E-05 | -6.943000E-06 | -9.303000E-06 |

FIG. 9

| Effective focal length (EFL) = 2.251 mm, HFOV (Half field of view) = 87.000 deg., TTL = 24.466 mm, Image height= 3.591 mm, Fno = 2.40 ||||||| |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 211 | 1st lens element | 17.992 | 2.992(T1) | 1.744(n1) | 44.904(v1) | -9.549(f1) | Glass |
| 212 | | 4.745 | 3.487(G12) | | | | |
| 221 | 2nd lens element | -126.389 | 1.085(T2) | 1.545(n2) | 55.987(v2) | -4.509(f2) | Plastic |
| 222 | | 2.520 | 2.155(G23) | | | | |
| 231 | 3rd lens element | 6.619 | 5.694(T3) | 1.689(n3) | 31.161(v3) | 8.140(f3) | Glass |
| 232 | | -24.707 | 0.389(G34-TA) | | | | |
| 200 | Aperture stop | INFINITY | -0.048(TA) | | | | |
| 241 | 4th lens element | 4.631 | 1.736(T4) | 1.545(n4) | 55.987(v4) | 4.946(f4) | Plastic |
| 242 | | -5.627 | 0.424(G45) | | | | |
| 251 | 5th lens element | -13.971 | 0.444(T5) | 1.642(n5) | 22.409(v5) | -3.732(f5) | Plastic |
| 252 | | 2.957 | 0.088(G56) | | | | |
| 261 | 6th lens element | 3.795 | 1.140(T6) | 1.545(n6) | 55.987(v6) | 4.171(f6) | Plastic |
| 262 | | -5.095 | 3.700(G6F) | | | | |
| 271 | IR cut filter | INFINITY | 0.300(TF) | 1.517(nf) | 64.167(vf) | | |
| 272 | | INFINITY | 0.881(GFP) | | | | |
| 280 | Image plane | INFINITY | 0.000 | | | | |

FIG. 12

| Aspherical parameters | | | | |
|---|---|---|---|---|
| Surface # | 221 | 222 | 241 | 242 |
| K | 0.000000E+00 | -5.090395E-01 | 0.000000E+00 | 3.823605E-01 |
| $a_4$ | -1.732460E-04 | 1.069061E-03 | -9.632760E-04 | -2.225775E-03 |
| $a_6$ | -1.002900E-05 | -9.545000E-06 | -7.257520E-04 | -3.894330E-03 |
| $a_8$ | 5.310000E-07 | -9.860000E-07 | 1.217570E-04 | 5.928490E-04 |
| $a_{10}$ | -8.000000E-09 | 9.400000E-08 | -1.223890E-04 | -8.384700E-05 |
| Surface # | 251 | 252 | 261 | 262 |
| K | 2.303791E+01 | 0.000000E+00 | 0.000000E+00 | -7.903620E+00 |
| $a_4$ | -2.448043E-02 | -2.994556E-02 | -1.273722E-02 | -1.001973E-02 |
| $a_6$ | -1.836497E-03 | 2.696355E-03 | 5.082220E-04 | 8.581370E-04 |
| $a_8$ | 6.759220E-04 | -1.028090E-04 | 7.656800E-05 | 1.713440E-04 |
| $a_{10}$ | 9.667000E-06 | 8.420000E-07 | -5.257000E-06 | -1.628900E-05 |

FIG. 13

| Effective focal length (EFL) = 2.298 mm, HFOV (Half field of view) = 87.000 deg., TTL = 21.978 mm, Image height= 3.583 mm, Fno = 2.40 ||||||| |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 311 | 1st lens element | 16.368 | 3.130(T1) | 1.744(n1) | 44.904(v1) | -9.142(f1) | Glass |
| 312 | | 4.425 | 3.430(G12) | | | | |
| 321 | 2nd lens element | -121.610 | 0.966(T2) | 1.545(n2) | 55.987(v2) | -4.004(f2) | Plastic |
| 322 | | 2.233 | 1.895(G23) | | | | |
| 331 | 3rd lens element | 5.568 | 3.381(T3) | 1.689(n3) | 31.161(v3) | 5.950(f3) | Glass |
| 332 | | -11.939 | 0.277(G34-TA) | | | | |
| 300 | Aperture stop | INFINITY | 0.050(TA) | | | | |
| 341 | 4th lens element | 7.038 | 1.696(T4) | 1.545(n4) | 55.987(v4) | 4.836(f4) | Plastic |
| 342 | | -3.869 | 0.293(G45) | | | | |
| 351 | 5th lens element | -6.740 | 0.564(T5) | 1.642(n5) | 22.409(v5) | -3.124(f5) | Plastic |
| 352 | | 2.984 | 0.080(G56) | | | | |
| 361 | 6th lens element | 3.733 | 1.529(T6) | 1.545(n6) | 55.987(v6) | 3.714(f6) | Plastic |
| 362 | | -3.800 | 3.700(G6F) | | | | |
| 371 | IR cut filter | INFINITY | 0.300(TF) | 1.517(nf) | 64.167(vf) | | |
| 372 | | INFINITY | 0.687(GFP) | | | | |
| 380 | Image plane | INFINITY | 0.000 | | | | |

FIG. 16

| Aspherical parameters | | | | |
|---|---|---|---|---|
| Surface # | 321 | 322 | 341 | 342 |
| K | 0.000000E+00 | -4.234045E-01 | 0.000000E+00 | -6.327935E-01 |
| $a_4$ | 4.701530E-04 | 4.437131E-03 | 1.271806E-03 | -4.320408E-03 |
| $a_6$ | -9.743300E-05 | 2.142540E-04 | -1.159941E-03 | -6.510635E-03 |
| $a_8$ | 4.881000E-06 | -1.016000E-06 | 5.630330E-04 | 1.160796E-03 |
| $a_{10}$ | -9.000000E-08 | 2.688000E-06 | -3.916890E-04 | -1.865770E-04 |
| Surface # | 351 | 352 | 361 | 362 |
| K | 4.610887E+00 | 0.000000E+00 | 0.000000E+00 | -2.970550E+00 |
| $a_4$ | -3.021351E-02 | -3.282128E-02 | -1.545020E-02 | -9.329933E-03 |
| $a_6$ | -4.943423E-03 | 2.580640E-03 | 7.023610E-04 | -4.436900E-05 |
| $a_8$ | 1.950220E-04 | -1.189590E-04 | 4.979900E-05 | 2.616340E-04 |
| $a_{10}$ | 2.605280E-04 | 2.050000E-06 | -4.635000E-06 | -1.665100E-05 |

FIG. 17

| Effective focal length (EFL) = 2.250 mm, HPOV (Half field of view) = 87.000 deg., TTL = 21.838 mm, Image height= 3.588 mm, Fno = 2.40 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 411 | 1st lens element | 13.693 | 1.102(T1) | 1.744(n1) | 44.904(v1) | -10.038(f1) | Glass |
| 412 | | 4.679 | 3.527(G12) | | | | |
| 421 | 2nd lens element | -127.703 | 0.883(T2) | 1.545(n2) | 55.987(v2) | -4.204(f2) | Plastic |
| 422 | | 2.344 | 1.432(G23) | | | | |
| 431 | 3rd lens element | 6.241 | 6.576(T3) | 1.689(n3) | 31.161(v3) | 7.267(f3) | Glass |
| 432 | | -14.823 | 0.156(G34-TA) | | | | |
| 400 | Aperture stop | INFINITY | 0.141(TA) | | | | |
| 441 | 4th lens element | 4.265 | 0.848(T4) | 1.545(n4) | 55.987(v4) | 5.211(f4) | Plastic |
| 442 | | -7.958 | 0.661(G45) | | | | |
| 451 | 5th lens element | -44.383 | 0.239(T5) | 1.642(n5) | 22.409(v5) | -3.810(f5) | Plastic |
| 452 | | 2.617 | 0.120(G56) | | | | |
| 461 | 6th lens element | 3.752 | 1.249(T6) | 1.545(n6) | 55.987(v6) | 4.070(f6) | Plastic |
| 462 | | -4.815 | 3.700(G6F) | | | | |
| 471 | IR cut filter | INFINITY | 0.300(TF) | 1.517(nf) | 64.167(vf) | | |
| 472 | | INFINITY | 0.903(GFP) | | | | |
| 480 | Image plane | INFINITY | 0.000 | | | | |

FIG. 20

| Aspherical parameters | | | | |
|---|---|---|---|---|
| Surface # | 421 | 422 | 441 | 442 |
| K | 0.000000E+00 | -5.255942E-01 | 0.000000E+00 | -3.394060E+00 |
| $a_4$ | -3.363310E-04 | 1.211321E-03 | 3.435400E-04 | 3.629382E-03 |
| $a_6$ | -9.144000E-06 | -8.187800E-05 | -4.854030E-04 | -4.450493E-03 |
| $a_8$ | 6.410000E-07 | 1.122600E-05 | 6.997400E-05 | 7.254960E-04 |
| $a_{10}$ | -9.000000E-09 | -1.745000E-06 | -2.372330E-04 | -2.402890E-04 |
| Surface # | 451 | 452 | 461 | 462 |
| K | 2.579607E+02 | 0.000000E+00 | 0.000000E+00 | -5.520055E+00 |
| $a_4$ | -2.178928E-02 | -3.619006E-02 | -1.438725E-02 | -8.233147E-03 |
| $a_6$ | -3.137384E-03 | 2.115205E-03 | 1.333534E-03 | 3.658740E-04 |
| $a_8$ | 1.138991E-03 | 3.617240E-04 | -3.225200E-05 | 3.397540E-04 |
| $a_{10}$ | 2.744500E-05 | -6.057800E-05 | 4.021000E-06 | -2.585100E-05 |

FIG. 21

| Surface # | | Radius (mm) | Thickness / air gap (mm) | Refractive index | Abbe number | Focal length (mm) | Material |
|---|---|---|---|---|---|---|---|
| | Effective focal length (EFL) = 2.241 mm, HFOV (Half field of view) = 87.000 deg., TTL = 22.161 mm, Image height = 3.592 mm, Fno = 2.40 |
| - | Object | INFINITY | INFINITY | | | | |
| 511 | 1st lens element | 16.389 | 2.660(T1) | 1.744(n1) | 44.904(v1) | -9.908(f1) | Glass |
| 512 | | 4.745 | 3.803(G12) | | | | |
| 521 | 2nd lens element | -129.955 | 0.981(T2) | 1.545(n2) | 55.987(v2) | -3.972(f2) | Plastic |
| 522 | | 2.212 | 2.251(G23) | | | | |
| 531 | 3rd lens element | 5.214 | 3.931(T3) | 1.689(n3) | 31.161(v3) | 6.919(f3) | Glass |
| 532 | | -41.195 | 0.178(G34-TA) | | | | |
| 500 | Aperture stop | INFINITY | -0.172(TA) | | | | |
| 541 | 4th lens element | 4.157 | 2.046(T4) | 1.545(n4) | 55.987(v4) | 4.073(f4) | Plastic |
| 542 | | -3.956 | 0.174(G45) | | | | |
| 551 | 5th lens element | -7.513 | 0.640(T5) | 1.642(n5) | 22.409(v5) | -3.139(f5) | Plastic |
| 552 | | 2.878 | 0.096(G56) | | | | |
| 561 | 6th lens element | 4.054 | 1.154(T6) | 1.545(n6) | 55.987(v6) | 4.101(f6) | Plastic |
| 562 | | -4.505 | 3.700(G6F) | | | | |
| 571 | IR cut filter | INFINITY | 0.300(TF) | 1.517(nf) | 64.167(vf) | | |
| 572 | | INFINITY | 0.421(GFP) | | | | |
| 580 | Image plane | INFINITY | 0.000 | | | | |

FIG. 24

| Aspherical parameters | | | | |
|---|---|---|---|---|
| Surface # | 521 | 522 | 541 | 542 |
| K | 0.000000E+00 | -4.785649E-01 | 0.000000E+00 | -1.647831E+00 |
| $a_4$ | -6.140490E-04 | 1.581001E-03 | 1.781745E-03 | -1.699021E-03 |
| $a_6$ | 1.605400E-05 | -1.278360E-04 | -9.225800E-04 | -9.872287E-03 |
| $a_8$ | 0.000000E+00 | 2.938100E-05 | 6.227900E-04 | 1.934017E-03 |
| $a_{10}$ | -6.000000E-09 | -1.253000E-06 | -2.874560E-04 | -2.222570E-04 |
| Surface # | 551 | 552 | 561 | 562 |
| K | 1.272612E+01 | 0.000000E+00 | 0.000000E+00 | -5.087613E+00 |
| $a_4$ | -2.979493E-02 | -3.301624E-02 | -8.777586E-03 | -9.078304E-03 |
| $a_6$ | -6.520614E-03 | 3.311186E-03 | -3.253300E-05 | 4.244600E-04 |
| $a_8$ | 1.024559E-03 | -3.102930E-04 | 1.245700E-04 | 3.684330E-04 |
| $a_{10}$ | 1.922840E-04 | 2.023000E-05 | -1.750000E-07 | -1.833300E-05 |

FIG. 25

| Effective focal length (EFL) = 2.248 mm, HFOV (Half field of view) = 87.000 deg., TTL = 18.152 mm, Image height= 3.581 mm, Fno = 2.40 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 611 | 1st lens element | 11.284 | 1.110(T1) | 1.744(n1) | 44.904(v1) | -10.233(f1) | Glass |
| 612 | | 4.365 | 3.490(G12) | | | | |
| 621 | 2nd lens element | -126.291 | 0.797(T2) | 1.545(n2) | 55.987(v2) | -3.423(f2) | Plastic |
| 622 | | 1.902 | 1.503(G23) | | | | |
| 631 | 3rd lens element | 4.589 | 3.439(T3) | 1.689(n3) | 31.161(v3) | 5.111(f3) | Glass |
| 632 | | -10.757 | 0.211(G34-TA) | | | | |
| 600 | Aperture stop | INFINITY | 0.119(TA) | | | | |
| 641 | 4th lens element | 5.935 | 0.854(T4) | 1.545(n4) | 55.987(v4) | 5.266(f4) | Plastic |
| 642 | | -5.298 | 0.419(G45) | | | | |
| 651 | 5th lens element | -10.134 | 0.200(T5) | 1.642(n5) | 22.409(v5) | -3.109(f5) | Plastic |
| 652 | | 2.531 | 0.086(G56) | | | | |
| 661 | 6th lens element | 3.454 | 1.217(T6) | 1.545(n6) | 55.987(v6) | 3.311(f6) | Plastic |
| 662 | | -3.324 | 3.700(G6F) | | | | |
| 671 | IR cut filter | INFINITY | 0.300(TF) | 1.517(nf) | 64.167(vf) | | |
| 672 | | INFINITY | 0.708(GFP) | | | | |
| 680 | Image plane | INFINITY | 0.000 | | | | |

FIG. 28

| Aspherical parameters | | | | |
|---|---|---|---|---|
| Surface # | 621 | 622 | 641 | 642 |
| K | 0.000000E+00 | -4.641303E-01 | 0.000000E+00 | -3.723593E+00 |
| $a_4$ | -1.465630E-04 | 4.202253E-03 | 4.499430E-04 | -1.738920E-04 |
| $a_6$ | -6.888300E-05 | 3.260560E-04 | -9.776160E-04 | -1.328941E-02 |
| $a_8$ | 5.050000E-06 | 2.050700E-05 | 3.630720E-04 | 2.805056E-03 |
| $a_{10}$ | -1.170000E-07 | 3.269000E-06 | -1.131654E-03 | -9.296870E-04 |
| Surface # | 651 | 652 | 661 | 662 |
| K | 2.208685E-01 | 0.000000E+00 | 0.000000E+00 | -3.017560E+00 |
| $a_4$ | -4.518008E-02 | -6.258407E-02 | -2.616870E-02 | -1.321720E-02 |
| $a_6$ | -7.300475E-03 | 9.314033E-03 | 3.586816E-03 | -3.168920E-04 |
| $a_8$ | 9.475280E-04 | -5.590100E-04 | -2.144620E-04 | 8.469720E-04 |
| $a_{10}$ | 7.645680E-04 | -2.528200E-05 | 8.735000E-06 | -5.815500E-05 |

FIG. 29

| Surface # | | Radius (mm) | Thickness / air gap (mm) | Refractive index | Abbe number | Focal length (mm) | Material |
|---|---|---|---|---|---|---|---|
| | Effective focal length (EFL) = 2.446 mm, HFOV (Half field of view) = 87.000 deg., TTL = 24.269 mm, Image height= 3.574 mm, Fno = 2.40 | | | | | | |
| - | Object | INFINITY | INFINITY | | | | |
| 711 | 1st lens element | 22.506 | 4.138(T1) | 1.744(n1) | 44.904(v1) | -7.223(f1) | Glass |
| 712 | | 4.010 | 2.969(G12) | | | | |
| 721 | 2nd lens element | -47.574 | 1.191(T2) | 1.545(n2) | 55.987(v2) | -4.767(f2) | Plastic |
| 722 | | 2.779 | 1.550(G23) | | | | |
| 731 | 3rd lens element | 5.594 | 4.167(T3) | 1.689(n3) | 31.161(v3) | 5.297(f3) | Glass |
| 732 | | -7.419 | 0.546(G34-TA) | | | | |
| 700 | Aperture stop | INFINITY | 0.643(TA) | | | | |
| 741 | 4th lens element | 282.549 | 0.998(T4) | 1.545(n4) | 55.987(v4) | 6.730(f4) | Plastic |
| 742 | | -3.721 | 0.040(G45) | | | | |
| 751 | 5th lens element | -10.894 | 0.695(T5) | 1.642(n5) | 22.409(v5) | -3.623(f5) | Plastic |
| 752 | | 3.063 | 0.113(G56) | | | | |
| 761 | 6th lens element | 3.924 | 1.761(T6) | 1.545(n6) | 55.987(v6) | 4.000(f6) | Plastic |
| 762 | | -4.148 | 3.700(G6F) | | | | |
| 771 | IR cut filter | INFINITY | 0.300(TF) | 1.517(nf) | 64.167(vf) | | |
| 772 | | INFINITY | 1.459(GFP) | | | | |
| 780 | Image plane | INFINITY | 0.000 | | | | |

FIG. 32

| Aspherical parameters | | | | |
|---|---|---|---|---|
| Surface # | 721 | 722 | 741 | 742 |
| K | 0.000000E+00 | -6.080013E-01 | 0.000000E+00 | -7.001389E-01 |
| $a_4$ | 7.609770E-04 | 4.854085E-03 | -4.339956E-03 | -3.973205E-03 |
| $a_6$ | -8.860600E-05 | 1.379440E-04 | 1.810520E-04 | -8.578655E-03 |
| $a_8$ | 2.874000E-06 | 1.593500E-05 | -1.977820E-04 | 2.286809E-03 |
| $a_{10}$ | -3.600000E-08 | -5.570000E-07 | -2.952280E-04 | -3.738070E-04 |
| Surface # | 751 | 752 | 761 | 762 |
| K | 1.060469E+01 | 0.000000E+00 | 0.000000E+00 | -2.507598E+00 |
| $a_4$ | -1.799246E-02 | -2.773286E-02 | -1.428623E-02 | -6.795259E-03 |
| $a_6$ | -7.019123E-03 | 1.015520E-03 | 1.843900E-04 | -4.847100E-05 |
| $a_8$ | 1.730417E-03 | 1.615180E-04 | 6.017800E-05 | 7.509300E-05 |
| $a_{10}$ | -5.253100E-05 | -2.063500E-05 | -3.480000E-06 | -1.071000E-05 |

FIG. 33

| Effective focal length (EFL) = 2.099 mm, HFOV (Half field of view) = 84.000 deg., TTL = 20.156 mm, Image height = 2.150 mm, Fno = 2.40 |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 811 | 1st lens element | 85.174 | 1.975(T1) | 1.744(n1) | 44.904(v1) | -6.474(f1) | Glass |
| 812 | | 4.531 | 2.327(G12) | | | | |
| 821 | 2nd lens element | -6.871 | 1.027(T2) | 1.545(n2) | 55.987(v2) | -4.108(f2) | Plastic |
| 822 | | 3.479 | 1.114(G23) | | | | |
| 831 | 3rd lens element | 5.396 | 3.596(T3) | 1.642(n3) | 22.409(v3) | 6.650(f3) | Plastic |
| 832 | | -15.237 | 1.231(G34-TA) | | | | |
| 800 | Aperture stop | INFINITY | 0.010(TA) | | | | |
| 841 | 4th lens element | 12.529 | 0.693(T4) | 1.639(n4) | 55.472(v4) | 5.772(f4) | Glass |
| 842 | | -5.134 | 0.255(G45) | | | | |
| 851 | 5th lens element | -9.993 | 0.599(T5) | 1.642(n5) | 22.409(v5) | -3.999(f5) | Plastic |
| 852 | | 3.544 | 0.077(G56) | | | | |
| 861 | 6th lens element | 3.982 | 1.005(T6) | 1.545(n6) | 55.987(v6) | 3.927(f6) | Plastic |
| 862 | | -4.185 | 2.731(G67) | | | | |
| 871 | 7th lens element | 12.096 | 0.656(T7) | 1.545(n7) | 55.987(v7) | 20.777(f7) | Plastic |
| 872 | | -165.516 | 0.480(G7F) | | | | |
| 881 | IR cut filter | INFINITY | 0.210(TF) | 1.517(nf) | 64.167(vf) | | |
| 882 | | INFINITY | 2.170(GFP) | | | | |
| 890 | Image plane | INFINITY | 0.000 | | | | |

FIG. 36

| Aspherical parameters | | | | | |
|---|---|---|---|---|---|
| Surface # | 821 | 822 | 831 | 832 | 851 |
| K | 0.000000E+00 | 0.000000E+00 | 0.000000E+00 | 0.000000E+00 | 0.000000E+00 |
| $a_4$ | -1.999925E-03 | -2.547655E-03 | -1.709265E-03 | 1.575578E-03 | -1.268696E-02 |
| $a_6$ | 6.338040E-04 | 6.979510E-04 | 3.560900E-05 | -1.923970E-04 | 5.957180E-04 |
| $a_8$ | -3.679500E-05 | 1.932180E-04 | 6.822000E-05 | 4.435600E-05 | -1.357800E-05 |
| $a_{10}$ | 0.000000E+00 | 0.000000E+00 | 0.000000E+00 | 0.000000E+00 | 0.000000E+00 |
| Surface # | 852 | 861 | 862 | 871 | 872 |
| K | 0.000000E+00 | 0.000000E+00 | 0.000000E+00 | -3.836683E+01 | 0.000000E+00 |
| $a_4$ | -1.387446E-02 | -5.829905E-03 | -1.424125E-03 | 9.882620E-04 | -1.754255E-03 |
| $a_6$ | 5.359220E-04 | -2.416670E-04 | 1.797790E-04 | -5.203570E-04 | -4.179130E-04 |
| $a_8$ | -1.968720E-04 | -4.900300E-05 | 1.259290E-04 | -4.335000E-06 | 6.768000E-06 |
| $a_{10}$ | 0.000000E+00 | 0.000000E+00 | 0.000000E+00 | 0.000000E+00 | 0.000000E+00 |

FIG. 37

| \multicolumn{7}{c}{Effective focal length (EFL) = 1.341 mm, HFOV (Half field of view) = 84.000 deg., TTL = 11.673 mm, Image height= 1.429 mm, Fno = 2.40} |
|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 911 | 1st lens element | 46.212 | 0.648(T1) | 1.744(n1) | 44.904(v1) | -3.557(f1) | Glass |
| 912 | | 2.498 | 2.087(G12) | | | | |
| 921 | 2nd lens element | -3.043 | 0.413(T2) | 1.545(n2) | 55.987(v2) | -3.034(f2) | Plastic |
| 922 | | 3.767 | 0.830(G23) | | | | |
| 931 | 3rd lens element | 2.423 | 1.986(T3) | 1.642(n3) | 22.409(v3) | 3.840(f3) | Plastic |
| 932 | | 87.793 | 0.109(G34-TA) | | | | |
| 900 | Aperture stop | INFINITY | 0.010(TA) | | | | |
| 941 | 4th lens element | 6.454 | 0.499(T4) | 1.639(n4) | 55.472(v4) | 2.782(f4) | Glass |
| 942 | | -2.388 | 0.210(G45) | | | | |
| 951 | 5th lens element | -2.780 | 0.331(T5) | 1.642(n5) | 22.409(v5) | -1.864(f5) | Plastic |
| 952 | | 2.206 | 0.070(G56) | | | | |
| 961 | 6th lens element | 2.287 | 0.918(T6) | 1.545(n6) | 55.987(v6) | 2.625(f6) | Plastic |
| 962 | | -3.252 | 0.100(G67) | | | | |
| 971 | 7th lens element | 5.889 | 0.583(T7) | 1.545(n7) | 55.987(v7) | 8.813(f7) | Plastic |
| 972 | | -24.700 | 0.500(G7F) | | | | |
| 981 | IR cut filter | INFINITY | 0.210(TF) | 1.517(nf) | 64.167(vf) | | |
| 982 | | INFINITY | 2.169(GFP) | | | | |
| 990 | Image plane | INFINITY | 0.000 | | | | |

FIG. 40

| Aspherical parameters | | | | | |
|---|---|---|---|---|---|
| Surface # | 921 | 922 | 931 | 932 | 951 |
| K | 0.000000E+00 | 0.000000E+00 | 0.000000E+00 | 0.000000E+00 | 0.000000E+00 |
| $a_4$ | 1.849731E-02 | 2.933354E-02 | 3.209273E-03 | 5.170160E-02 | 1.266842E-02 |
| $a_6$ | -3.278502E-03 | 5.205000E-05 | 1.906197E-03 | 7.615813E-03 | -1.387208E-02 |
| $a_8$ | 3.888100E-04 | -7.177200E-05 | -1.615506E-03 | -3.331316E-03 | -5.388764E-03 |
| $a_{10}$ | 0.000000E+00 | 0.000000E+00 | 0.000000E+00 | 0.000000E+00 | 0.000000E+00 |
| Surface # | 952 | 961 | 962 | 971 | 972 |
| K | 0.000000E+00 | 0.000000E+00 | 0.000000E+00 | -1.897839E+01 | 0.000000E+00 |
| $a_4$ | -2.979497E-03 | 6.243636E-03 | -4.884794E-02 | -3.154820E-02 | 1.466671E-02 |
| $a_6$ | -2.433759E-02 | -2.007363E-02 | 5.257217E-03 | -3.086651E-03 | -1.420218E-02 |
| $a_8$ | 7.157990E-04 | 2.906417E-03 | 2.397414E-03 | 6.152474E-03 | 8.868430E-03 |
| $a_{10}$ | 0.000000E+00 | 0.000000E+00 | 0.000000E+00 | 0.000000E+00 | 0.000000E+00 |

FIG. 41

| Effective focal length (EFL) = 1.691 mm, HFOV (Half field of view) = 84.000 deg., TTL = 18.595 mm, Image height = 1.842 mm, Fno = 2.40 |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 1011 | 1st lens element | 91.766 | 3.037(T1) | 1.744(n1) | 44.904(v1) | -4.125(f1) | Glass |
| 1012 | | 2.939 | 1.790(G12) | | | | |
| 1021 | 2nd lens element | -6.102 | 1.058(T2) | 1.545(n2) | 55.987(v2) | -5.985(f2) | Plastic |
| 1022 | | 7.384 | 1.354(G23) | | | | |
| 1031 | 3rd lens element | 5.371 | 3.710(T3) | 1.642(n3) | 22.409(v3) | 7.008(f3) | Plastic |
| 1032 | | -20.442 | 1.070(G34-TA) | | | | |
| 1000 | Aperture stop | INFINITY | 0.010(TA) | | | | |
| 1041 | 4th lens element | 7.462 | 0.512(T4) | 1.639(n4) | 55.472(v4) | 4.656(f4) | Glass |
| 1042 | | -4.836 | 0.100(G45) | | | | |
| 1051 | 5th lens element | -8.006 | 0.280(T5) | 1.642(n5) | 22.409(v5) | -3.640(f5) | Plastic |
| 1052 | | 3.353 | 0.070(G56) | | | | |
| 1061 | 6th lens element | 3.101 | 0.813(T6) | 1.545(n6) | 55.987(v6) | 3.518(f6) | Plastic |
| 1062 | | -4.520 | 1.612(G67) | | | | |
| 1071 | 7th lens element | 11.478 | 0.300(T7) | 1.545(n7) | 55.987(v7) | 86.359(f7) | Plastic |
| 1072 | | 15.057 | 0.500(G7F) | | | | |
| 1081 | IR cut filter | INFINITY | 0.210(TF) | 1.517(nf) | 64.167(vf) | | |
| 1082 | | INFINITY | 2.169(GFP) | | | | |
| 1090 | Image plane | INFINITY | 0.000 | | | | |

FIG. 44

| Aspherical parameters | | | | | |
|---|---|---|---|---|---|
| Surface # | 1021 | 1022 | 1031 | 1032 | 1051 |
| K | 0.000000E+00 | 0.000000E+00 | 0.000000E+00 | 0.000000E+00 | 0.000000E+00 |
| $a_4$ | 2.263836E-03 | 5.450538E-03 | -7.673130E-04 | 2.506522E-03 | -1.977546E-02 |
| $a_6$ | 2.878250E-04 | 9.185880E-04 | 2.562990E-04 | -1.645350E-04 | 6.298690E-04 |
| $a_8$ | -3.187700E-05 | 4.810500E-05 | 1.679000E-06 | 1.440900E-05 | -2.778500E-05 |
| $a_{10}$ | 0.000000E+00 | 0.000000E+00 | 0.000000E+00 | 0.000000E+00 | 0.000000E+00 |
| Surface # | 1052 | 1061 | 1062 | 1071 | 1072 |
| K | 0.000000E+00 | 0.000000E+00 | 0.000000E+00 | -3.836374E+01 | 0.000000E+00 |
| $a_4$ | -1.451756E-02 | -6.000284E-03 | -8.562345E-03 | -1.366662E-02 | -1.048889E-02 |
| $a_6$ | -1.759364E-03 | -2.288715E-03 | 1.678642E-03 | 2.406789E-03 | 2.860156E-03 |
| $a_8$ | -9.570400E-05 | 3.480100E-04 | 3.389020E-04 | -8.949400E-05 | 6.875500E-05 |
| $a_{10}$ | 0.000000E+00 | 0.000000E+00 | 0.000000E+00 | 0.000000E+00 | 0.000000E+00 |

FIG. 45

| Effective focal length (EFL) = 1.350 mm, HFOV (Half field of view) = 84.000 deg., TTL = 12.544 mm, Image height = 1.436 mm, Fno = 2.40 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 11'11 | 1st lens element | 72.273 | 1.403(T1) | 1.744(n1) | 44.904(v1) | -3.648(f1) | Glass |
| 11'12 | | 2.605 | 2.177(G12) | | | | |
| 11'21 | 2nd lens element | -3.245 | 0.338(T2) | 1.545(n2) | 55.987(v2) | -2.975(f2) | Plastic |
| 11'22 | | 3.337 | 0.659(G23) | | | | |
| 11'31 | 3rd lens element | 2.899 | 2.252(T3) | 1.642(n3) | 22.409(v3) | 4.709(f3) | Plastic |
| 11'32 | | 47.097 | 0.107(G34-TA) | | | | |
| 11'00 | Aperture stop | INFINITY | 0.010(TA) | | | | |
| 11'41 | 4th lens element | 3.820 | 1.079(T4) | 1.639(n4) | 55.472(v4) | 2.535(f4) | Glass |
| 11'42 | | -2.514 | 0.100(G45) | | | | |
| 11'51 | 5th lens element | -5.420 | 0.280(T5) | 1.642(n5) | 22.409(v5) | -2.492(f5) | Plastic |
| 11'52 | | 2.321 | 0.070(G56) | | | | |
| 11'61 | 6th lens element | 2.387 | 0.788(T6) | 1.545(n6) | 55.987(v6) | 2.963(f6) | Plastic |
| 11'62 | | -4.366 | 0.100(G67) | | | | |
| 11'71 | 7th lens element | 3.540 | 0.302(T7) | 1.545(n7) | 55.987(v7) | 27.478(f7) | Plastic |
| 11'72 | | 4.502 | 0.500(G7F) | | | | |
| 11'81 | IR cut filter | INFINITY | 0.210(TF) | 1.517(nf) | 64.167(vf) | | |
| 11'82 | | INFINITY | 2.169(GFP) | | | | |
| 11'90 | Image plane | INFINITY | 0.000 | | | | |

FIG. 48

| Aspherical parameters | | | | | |
|---|---|---|---|---|---|
| Surface # | 11'21 | 11'22 | 11'31 | 11'32 | 11'51 |
| K | 0.000000E+00 | 0.000000E+00 | 0.000000E+00 | 0.000000E+00 | 0.000000E+00 |
| $a_4$ | 2.512986E-02 | 3.918330E-02 | 3.148988E-03 | 2.929197E-02 | -1.465088E-02 |
| $a_6$ | -3.190489E-03 | 5.237783E-03 | 3.188291E-03 | 3.893130E-03 | 1.568107E-03 |
| $a_8$ | 1.649080E-04 | 7.016030E-04 | -6.199750E-04 | 2.039565E-03 | -4.808470E-04 |
| $a_{10}$ | 0.000000E+00 | 0.000000E+00 | 0.000000E+00 | 0.000000E+00 | 0.000000E+00 |
| Surface # | 11'52 | 11'61 | 11'62 | 11'71 | 11'72 |
| K | 0.000000E+00 | 0.000000E+00 | 0.000000E+00 | -5.372340E+00 | 0.000000E+00 |
| $a_4$ | -1.127873E-02 | 6.831519E-03 | -1.596087E-02 | -5.451943E-03 | 7.121003E-03 |
| $a_6$ | -1.597035E-03 | -6.985530E-03 | 3.326528E-03 | -6.828020E-04 | -2.630810E-03 |
| $a_8$ | -3.188263E-03 | -9.280090E-04 | 7.912970E-04 | 5.041166E-03 | 7.805750E-03 |
| $a_{10}$ | 0.000000E+00 | 0.000000E+00 | 0.000000E+00 | 0.000000E+00 | 0.000000E+00 |

FIG. 49

| Effective focal length (EFL) = 1.376 mm, HFOV (Half field of view) = 84.000 deg., TTL = 14.115 mm, Image height= 1.487 mm, Fno = 2.40 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 12'11 | 1st lens element | 73.130 | 2.056(T1) | 1.744(n1) | 44.904(v1) | -3.100(f1) | Glass |
| 12'12 | | 2.218 | 1.907(G12) | | | | |
| 12'21 | 2nd lens element | -4.186 | 0.620(T2) | 1.545(n2) | 55.987(v2) | -4.259(f2) | Plastic |
| 12'22 | | 5.443 | 0.996(G23) | | | | |
| 12'31 | 3rd lens element | 2.760 | 2.172(T3) | 1.642(n3) | 22.409(v3) | 4.851(f3) | Plastic |
| 12'32 | | 16.556 | 0.421(G34-TA) | | | | |
| 12'00 | Aperture stop | INFINITY | 0.010(TA) | | | | |
| 12'41 | 4th lens element | 7.575 | 0.832(T4) | 1.639(n4) | 55.472(v4) | 3.136(f4) | Glass |
| 12'42 | | -2.618 | 0.098(G45) | | | | |
| 12'51 | 5th lens element | -4.719 | 0.281(T5) | 1.642(n5) | 22.409(v5) | -2.528(f5) | Plastic |
| 12'52 | | 2.538 | 0.070(G56) | | | | |
| 12'61 | 6th lens element | 2.571 | 0.810(T6) | 1.545(n6) | 55.987(v6) | 2.918(f6) | Plastic |
| 12'62 | | -3.674 | 0.563(G67) | | | | |
| 12'71 | 7th lens element | 6.603 | 0.400(T7) | 1.545(n7) | 55.987(v7) | 17.177(f7) | Plastic |
| 12'72 | | 22.106 | 0.500(G7F) | | | | |
| 12'81 | IR cut filter | INFINITY | 0.210(TF) | 1.517(nf) | 64.167(vf) | | |
| 12'82 | | INFINITY | 2.169(GFP) | | | | |
| 12'90 | Image plane | INFINITY | 0.000 | | | | |

FIG. 52

| Aspherical parameters | | | | | |
|---|---|---|---|---|---|
| Surface # | 12'21 | 12'22 | 12'31 | 12'32 | 12'51 |
| K | 0.000000E+00 | 0.000000E+00 | 0.000000E+00 | 0.000000E+00 | 0.000000E+00 |
| $a_4$ | 9.651206E-03 | 1.351937E-02 | 2.760697E-03 | 3.436149E-02 | -1.157497E-02 |
| $a_6$ | -1.817209E-03 | 5.323130E-04 | 1.873675E-03 | 8.188639E-03 | 3.851013E-03 |
| $a_8$ | -4.628400E-05 | -6.343600E-04 | -3.432880E-04 | 3.279233E-03 | 1.326025E-03 |
| $a_{10}$ | 0.000000E+00 | 0.000000E+00 | 0.000000E+00 | 0.000000E+00 | 0.000000E+00 |
| Surface # | 12'52 | 12'61 | 12'62 | 12'71 | 12'72 |
| K | 0.000000E+00 | 0.000000E+00 | 0.000000E+00 | -1.410275E+01 | 0.000000E+00 |
| $a_4$ | -4.943848E-03 | -6.326080E-04 | -1.932406E-02 | -8.412151E-03 | 1.811219E-03 |
| $a_6$ | -5.224368E-03 | -6.870527E-03 | 4.421217E-03 | 1.602331E-03 | -1.093751E-03 |
| $a_8$ | -7.103860E-04 | 2.997390E-04 | 7.105710E-04 | 1.792339E-03 | 2.327799E-03 |
| $a_{10}$ | 0.000000E+00 | 0.000000E+00 | 0.000000E+00 | 0.000000E+00 | 0.000000E+00 |

FIG. 53

| \multicolumn{7}{c}{Effective focal length (EFL) = 2.065 mm, HFOV (Half field of view) = 84.000 deg., TTL = 22.099 mm, Image height= 2.134 mm, Fno = 2.40} |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 13'11 | 1st lens element | 872.934 | 1.836(T1) | 1.744(n1) | 44.904(v1) | -7.265(f1) | Glass |
| 13'12 | | 5.389 | 2.373(G12) | | | | |
| 13'21 | 2nd lens element | -15.963 | 0.725(T2) | 1.545(n2) | 55.987(v2) | -4.008(f2) | Plastic |
| 13'22 | | 2.561 | 1.100(G23) | | | | |
| 13'31 | 3rd lens element | 6.181 | 5.804(T3) | 1.642(n3) | 22.409(v3) | 7.633(f3) | Plastic |
| 13'32 | | -15.077 | 0.174(G34-TA) | | | | |
| 13'00 | Aperture stop | INFINITY | 0.010(TA) | | | | |
| 13'41 | 4th lens element | 10.447 | 1.010(T4) | 1.639(n4) | 55.472(v4) | 5.963(f4) | Glass |
| 13'42 | | -5.796 | 0.575(G45) | | | | |
| 13'51 | 5th lens element | -7.648 | 0.452(T5) | 1.642(n5) | 22.409(v5) | -3.985(f5) | Plastic |
| 13'52 | | 3.944 | 0.090(G56) | | | | |
| 13'61 | 6th lens element | 4.395 | 1.328(T6) | 1.545(n6) | 55.987(v6) | 4.089(f6) | Plastic |
| 13'62 | | -4.014 | 3.024(G67) | | | | |
| 13'71 | 7th lens element | 26.930 | 0.718(T7) | 1.545(n7) | 55.987(v7) | 14.546(f7) | Plastic |
| 13'72 | | -11.079 | 0.500(G7F) | | | | |
| 13'81 | IR cut filter | INFINITY | 0.210(TF) | 1.517(nf) | 64.167(vf) | | |
| 13'82 | | INFINITY | 2.169(GFP) | | | | |
| 13'90 | Image plane | INFINITY | 0.000 | | | | |

FIG. 56

| Aspherical parameters | | | | | |
|---|---|---|---|---|---|
| Surface # | 13'21 | 13'22 | 13'31 | 13'32 | 13'51 |
| K | 0.000000E+00 | 0.000000E+00 | 0.000000E+00 | 0.000000E+00 | 0.000000E+00 |
| $a_4$ | 3.423710E-04 | -2.404993E-03 | -1.171799E-03 | -2.505658E-03 | -1.810820E-02 |
| $a_6$ | -4.806700E-05 | -1.098200E-05 | 1.939100E-05 | -4.587140E-04 | -5.736520E-04 |
| $a_8$ | 2.214000E-06 | 4.493000E-06 | 2.187600E-05 | 5.562000E-05 | 7.033300E-05 |
| $a_{10}$ | 0.000000E+00 | 0.000000E+00 | 0.000000E+00 | 0.000000E+00 | 0.000000E+00 |
| Surface # | 13'52 | 13'61 | 13'62 | 13'71 | 13'72 |
| K | 0.000000E+00 | 0.000000E+00 | 0.000000E+00 | -1.809699E+02 | 0.000000E+00 |
| $a_4$ | -1.502478E-02 | -9.520625E-03 | -5.010258E-03 | -3.592970E-04 | -1.144880E-04 |
| $a_6$ | -1.312030E-04 | -4.544330E-04 | 1.394200E-04 | 2.467600E-05 | -9.555700E-05 |
| $a_8$ | 2.920000E-06 | 1.957900E-05 | 3.507300E-05 | -3.911000E-06 | -3.200000E-06 |
| $a_{10}$ | 0.000000E+00 | 0.000000E+00 | 0.000000E+00 | 0.000000E+00 | 0.000000E+00 |

FIG. 57

| Embodiment | 1st | 2nd | 3rd | 4th | 5th | 6th | 7th |
|---|---|---|---|---|---|---|---|
| T1 | 3.801 | 2.992 | 3.130 | 1.102 | 2.660 | 1.110 | 4.138 |
| G12 | 3.128 | 3.487 | 3.430 | 3.527 | 3.803 | 3.490 | 2.969 |
| T2 | 1.180 | 1.085 | 0.966 | 0.883 | 0.981 | 0.797 | 1.191 |
| G23 | 1.748 | 2.155 | 1.895 | 1.432 | 2.251 | 1.503 | 1.550 |
| T3 | 4.130 | 5.694 | 3.381 | 6.576 | 3.931 | 3.439 | 4.167 |
| G34 | 0.966 | 0.341 | 0.327 | 0.297 | 0.006 | 0.330 | 1.188 |
| T4 | 1.258 | 1.736 | 1.696 | 0.848 | 2.046 | 0.854 | 0.998 |
| G45 | 0.071 | 0.424 | 0.293 | 0.661 | 0.174 | 0.419 | 0.040 |
| T5 | 0.688 | 0.444 | 0.564 | 0.239 | 0.640 | 0.200 | 0.695 |
| G56 | 0.116 | 0.088 | 0.080 | 0.120 | 0.096 | 0.086 | 0.113 |
| T6 | 1.709 | 1.140 | 1.529 | 1.249 | 1.154 | 1.217 | 1.761 |
| BFL | 5.262 | 4.881 | 4.687 | 4.903 | 4.421 | 4.708 | 5.459 |
| EFL | 2.409 | 2.251 | 2.298 | 2.250 | 2.241 | 2.248 | 2.446 |
| TTL | 24.058 | 24.466 | 21.978 | 21.838 | 22.161 | 18.152 | 24.268 |
| ALT | 12.767 | 13.090 | 11.267 | 10.897 | 11.411 | 7.616 | 12.949 |
| AAG | 6.029 | 6.495 | 6.024 | 6.037 | 6.329 | 5.829 | 5.860 |
| Tmax | 4.130 | 5.694 | 3.381 | 6.576 | 3.931 | 3.439 | 4.167 |
| Tmin | 0.688 | 0.444 | 0.564 | 0.239 | 0.640 | 0.200 | 0.695 |
| Tmax/Tmin | 6.001 | 12.831 | 6.000 | 27.504 | 6.139 | 17.194 | 6.000 |
| T3/T2 | 3.500 | 5.248 | 3.500 | 7.447 | 4.006 | 4.314 | 3.500 |
| TTL/(T1+T2) | 4.830 | 6.001 | 5.365 | 11.000 | 6.087 | 9.520 | 4.555 |
| (T1+T4)/EFL | 2.100 | 2.100 | 2.100 | 0.867 | 2.100 | 0.873 | 2.100 |
| (G12+G23)/T1 | 1.283 | 1.885 | 1.701 | 4.500 | 2.276 | 4.500 | 1.092 |
| T3/(G23+G34) | 1.522 | 2.282 | 1.522 | 3.804 | 1.742 | 1.876 | 1.522 |
| (G12+G34)/EFL | 1.699 | 1.700 | 1.635 | 1.700 | 1.700 | 1.699 | 1.700 |
| (T2+T3)/T4 | 4.221 | 3.905 | 2.563 | 8.798 | 2.401 | 4.962 | 5.367 |
| (T1+T2+T3)/(G12+G23+G34) | 1.560 | 1.633 | 1.323 | 1.629 | 1.249 | 1.004 | 1.664 |
| TTL/(T3+T4) | 4.465 | 3.293 | 4.329 | 2.941 | 3.708 | 4.229 | 4.698 |
| (T1+G12)/(T2+G23) | 2.366 | 2.000 | 2.293 | 2.000 | 2.000 | 2.000 | 2.593 |
| Tmax/(G12+G34) | 1.009 | 1.488 | 0.900 | 1.720 | 1.032 | 0.900 | 1.002 |
| EFL/Tmin | 3.500 | 5.073 | 4.078 | 9.410 | 3.500 | 11.240 | 3.522 |
| T1/T4 | 3.022 | 1.724 | 1.846 | 1.300 | 1.300 | 1.300 | 4.145 |
| (G12+G23)/(T2+T4) | 2.000 | 2.000 | 2.000 | 2.865 | 2.000 | 3.025 | 2.065 |
| TTL/EFL | 9.987 | 10.869 | 9.564 | 9.706 | 9.889 | 8.075 | 9.922 |
| TTL/Tmax | 5.825 | 4.297 | 6.500 | 3.321 | 5.638 | 5.279 | 5.824 |
| (G23+G34)/T2 | 2.300 | 2.300 | 2.300 | 1.958 | 2.300 | 2.300 | 2.300 |
| (T3+T4)/EFL | 2.237 | 3.301 | 2.209 | 3.300 | 2.667 | 1.909 | 2.112 |

FIG. 58A

| Embodiment | 8th | 9th | 10th | 11th | 12th | 13th |
|---|---|---|---|---|---|---|
| T1 | 1.975 | 0.648 | 3.037 | 1.403 | 2.056 | 1.836 |
| G12 | 2.327 | 2.087 | 1.790 | 2.177 | 1.907 | 2.373 |
| T2 | 1.027 | 0.413 | 1.058 | 0.338 | 0.620 | 0.725 |
| G23 | 1.114 | 0.830 | 1.354 | 0.659 | 0.996 | 1.100 |
| T3 | 3.596 | 1.986 | 3.710 | 2.252 | 2.172 | 5.804 |
| G34 | 1.241 | 0.119 | 1.080 | 0.117 | 0.431 | 0.184 |
| T4 | 0.693 | 0.499 | 0.512 | 1.079 | 0.832 | 1.010 |
| G45 | 0.255 | 0.210 | 0.100 | 0.100 | 0.098 | 0.575 |
| T5 | 0.599 | 0.331 | 0.280 | 0.280 | 0.281 | 0.452 |
| G56 | 0.077 | 0.070 | 0.070 | 0.070 | 0.070 | 0.090 |
| T6 | 1.005 | 0.918 | 0.813 | 0.788 | 0.810 | 1.328 |
| G67 | 2.731 | 0.100 | 1.612 | 0.100 | 0.563 | 3.024 |
| T7 | 0.656 | 0.583 | 0.300 | 0.302 | 0.400 | 0.718 |
| BFL | 2.860 | 2.879 | 2.879 | 2.879 | 2.879 | 2.879 |
| EFL | 2.099 | 1.341 | 1.691 | 1.350 | 1.376 | 2.065 |
| TTL | 20.157 | 11.673 | 18.595 | 12.544 | 14.115 | 22.098 |
| ALT | 9.551 | 5.377 | 9.711 | 6.442 | 7.172 | 11.874 |
| AAG | 7.746 | 3.417 | 6.005 | 3.223 | 4.065 | 7.346 |
| Tmax | 3.596 | 1.986 | 3.710 | 2.252 | 2.172 | 5.804 |
| Tmin | 0.599 | 0.331 | 0.280 | 0.280 | 0.281 | 0.452 |
| Tmax/Tmin | 6.001 | 6.001 | 13.256 | 8.047 | 7.716 | 12.832 |
| T3/T2 | 3.501 | 4.809 | 3.505 | 6.667 | 3.500 | 8.001 |
| TTL/(T1+T2) | 6.715 | 11.000 | 4.540 | 7.206 | 5.274 | 8.626 |
| (T1+T4)/EFL | 1.271 | 0.855 | 2.099 | 1.839 | 2.099 | 1.378 |
| (G12+G23)/T1 | 1.742 | 4.500 | 1.035 | 2.022 | 1.412 | 1.891 |
| T3/(G23+G34) | 1.527 | 2.092 | 1.524 | 2.901 | 1.522 | 4.521 |
| (G12+G34)/EFL | 1.700 | 1.645 | 1.697 | 1.699 | 1.699 | 1.238 |
| (T2+T3)/T4 | 6.675 | 4.810 | 9.305 | 2.400 | 3.358 | 6.467 |
| (T1+T2+T3)/(G12+G23+G34) | 1.409 | 1.004 | 1.848 | 1.352 | 1.454 | 2.288 |
| TTL/(T3+T4) | 4.700 | 4.698 | 4.404 | 3.765 | 4.700 | 3.243 |
| (T1+G12)/(T2+G23) | 2.010 | 2.200 | 2.001 | 3.590 | 2.452 | 2.307 |
| Tmax/(G12+G34) | 1.008 | 0.900 | 1.293 | 0.982 | 0.929 | 2.270 |
| EFL/Tmin | 3.503 | 4.053 | 6.042 | 4.823 | 4.888 | 4.565 |
| T1/T4 | 2.851 | 1.300 | 5.927 | 1.300 | 2.472 | 1.819 |
| (G12+G23)/(T2+T4) | 2.001 | 3.200 | 2.002 | 2.002 | 2.000 | 2.002 |
| TTL/EFL | 9.603 | 8.704 | 10.996 | 9.292 | 10.258 | 10.701 |
| TTL/Tmax | 5.605 | 5.878 | 5.012 | 5.569 | 6.499 | 3.808 |
| (G23+G34)/T2 | 2.293 | 2.299 | 2.300 | 2.298 | 2.300 | 1.770 |
| (T3+T4)/EFL | 2.043 | 1.853 | 2.497 | 2.468 | 2.183 | 3.300 |

FIG. 58B

OPTICAL IMAGING LENS

CROSS-REFERENCE TO RELATED APPLICATIONS

This application claims priority to P.R.C. Patent Application No. 201710426868.1 titled "Optical Imaging Lens", filed on Jun. 8, 2017 at the State Intellectual Property Office of the People's Republic of China (SIPO), which is incorporated by reference herein in its entirety.

TECHNICAL FIELD

The present disclosure relates to an optical imaging lens, and particularly, relates to an optical imaging lens having at least six lens elements.

BACKGROUND

The ever-increasing demand for smaller sized electrical devices, such as cell phones, digital cameras, tablet computers, personal digital assistants (PDAs), vehicle electronics, etc. has triggered a corresponding need for smaller sized photography modules contained within the device, such as optical imaging lenses, module housing units, image sensors, etc. Size reductions may be achieved from various aspects of the electrical devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenging problem. Furthermore, achieving a high view angle and a great aperture size are important in certain applications, such as situations where a photography module is used in vehicles.

In light of the above issues, designing an optical imaging lens with a shorter length is not easily achieved by merely decreasing the size of each element proportionally. This is especially true for an optical imaging lens mounted with six lens elements, in which the distance between an object-side surface of the first lens element and an imaging plane along an optical axis may be great. Additionally, factors such as material nature, production difficulty, assembly yield, and so forth are crucial to the application of the design.

Further, the electrical devices may be utilized in various types of environments in which the temperature variation may be high enough to shift the focusing points of the photography modules therein. Therefore, thermal stability is a dominant factor to isolate the focal shift from the change of the temperature. Accordingly, there is a need for optical imaging lenses which are capable of comprising six lens elements therein, with a shorter length, better thermal stability, while also having good optical characteristics.

SUMMARY

The present disclosure provides for optical imaging lenses. By controlling the convex or concave shape of the surfaces of the lens elements and satisfying at least one inequality, the half field of view (HFOV) of the optical imaging lens may be broadened and the thermal stability may be promoted while maintaining good imaging quality and system functionality.

In an example embodiment, an optical imaging lens may comprise at least six lens elements. For example, the optical imaging lens may comprise a first lens element, a second lens element, a third lens element, a fourth lens element, a fifth lens element, a sixth lens element, and so on. When the optical imaging lens comprises six lens elements, the last lens element is the sixth lens element. An additional seventh lens element may be included in some optical imaging lenses, and, in such cases, the last lens element is the seventh lens element. All of the lens elements may be positioned sequentially from an object side to an image side along an optical axis. Each of the lens elements has refracting power, an object-side surface facing toward the object side, and an image-side surface facing toward the image side.

In the specification, parameters used here are: a central thickness of the first lens element along the optical axis is represented by T1, an air gap between the first lens element and the second lens element along the optical axis is represented by G12, a central thickness of the second lens element along the optical axis is represented by T2, an air gap between the second lens element and the third lens element along the optical axis is represented by G23, a central thickness of the third lens element along the optical axis is represented by T3, the distance between an aperture stop and the object-side surface of the next lens element along the optical axis is represented by TA, an air gap between the third lens element and the fourth lens element along the optical axis is represented by G34, a central thickness of the fourth lens element along the optical axis is represented by T4, an air gap between the fourth lens element and the fifth lens element along the optical axis is represented by G45, a central thickness of the fifth lens element along the optical axis is represented by T5, an air gap between the fifth lens element and the sixth lens element along the optical axis is represented by G56, a central thickness of the sixth lens element along the optical axis is represented by T6, an air gap between the sixth lens element and the seventh lens element along the optical axis is represented by G67, a central thickness of the seventh lens element along the optical axis is represented by T7, a distance between the image-side surface of the sixth lens element and the object-side surface of a filtering unit along the optical axis is represented by G6F, a distance between the image-side surface of the seventh lens element and the object-side surface of a filtering unit along the optical axis is represented by G7F, a central thickness of the filtering unit along the optical axis is represented by TF, a distance between the image-side surface of the filtering unit and an image plane along the optical axis is represented by GFP, a focusing length of the first lens element is represented by f1, a focusing length of the second lens element is represented by f2, a focusing length of the third lens element is represented by f3, a focusing length of the fourth lens element is represented by f4, a focusing length of the fifth lens element is represented by f5, a focusing length of the sixth lens element is represented by f6, a focusing length of the seventh lens element is represented by f7, the refractive index of the first lens element is represented by n1, the refractive index of the second lens element is represented by n2, the refractive index of the third lens element is represented by n3, the refractive index of the fourth lens element is represented by n4, the refractive index of the fifth lens element is represented by n5, the refractive index of the sixth lens element is represented by n6, the refractive index of the seventh lens element is represented by n7, the refractive index of the filtering unit is represented by nf, an abbe number of the first lens element is represented by V1, an abbe number of the second lens element is represented by V2, an abbe number of the third lens element is represented by V3, an abbe number of the fourth lens element is represented by V4, an abbe number of the fifth lens element is represented by V5, an abbe number of the sixth lens element is represented by V6, an abbe number of the seventh lens element is represented by V7, an effective focal length of the optical imaging lens is represented by EFL or f, a distance between the object-side surface of the first lens element and the image-side surface of the last lens element along the optical axis is represented by TL, a distance between the object-side surface of the first lens element and the image plane along the optical axis is represented by TTL, a sum of the central thicknesses of all lens elements along the optical axis, i.e. a sum of T1, T2, T3, T4, T5 and T6 or a sum of T1, T2, T3, T4, T5, T6 and T7 is represented by ALT, a sum of all air gaps from the first lens element to the last lens element along the optical axis, i.e. a sum of G12, G23, G34, G45 and G56 or a sum of G12, G23, G34, G45, G56 and G67 is represented by AAG, and a back focal length of the optical imaging lens, which is defined as the distance from the image-side surface of the last lens element to the image plane along the optical axis, i.e. a sum of G6F, TF and GFP or a sum of G7F, TF and GFP is represented by BFL. A maximum central thickness of a lens element having refracting power among all lens elements is represented by Tmax. A minimum central thickness of a lens element having refracting power among all lens elements is represented by Tmin.

In an aspect of the present disclosure, in the optical imaging lens, the first lens element may have negative refracting power, the object-side surface of the second lens element may comprise a concave portion in a vicinity of the optical axis, the image-side surface of the second lens element may comprise a concave portion in a vicinity of the optical axis, the image-side surface of the fourth lens element may comprise a convex portion in a vicinity of a periphery of the fourth lens element, the object-side surface of the fifth lens element may comprise a concave portion in a vicinity of the optical axis, the object-side surface of the sixth lens element may comprise a convex portion in a vicinity of the optical axis, and the image-side surface of the sixth lens element may comprise a convex portion in a vicinity of a periphery of the sixth lens element. The optical imaging lens may satisfy at least one inequality, such as:

$T\max/T\min \geq 6.0$      Inequality (1).

In another example embodiment, other inequality(s), such as those relating to the ratio among parameters could be taken into consideration. For example:

$T3/T2 \geq 3.5$      Inequality (2);

$TTL/(T1+T2) \leq 11.0$      Inequality (3);

$(T1+T4)/EFL \leq 2.1$      Inequality (4);

$(G12+G23)/T1 \leq 4.5$      Inequality (5);

$T3/(G23+G34) \geq 1.4$      Inequality (6);

$(G12+G34)/EFL \leq 1.7$      Inequality (7);

$(T2+T3)/T4 \geq 2.4$      Inequality (8);

$(T1+T2+T3)/(G12+G23+G34) \geq 1.0$      Inequality (9);

$TTL/(T3+T4) \leq 4.7$      Inequality (10);

$(T1+G12)/(T2+G23) \geq 2.0$      Inequality (11);

$T\max/(G12+G34) \geq 0.9$      Inequality (12);

$EFL/T\min \geq 3.5$      Inequality (13);

$T1/T4 \geq 1.3$      Inequality (14);

$(G12+G23)/(T2+T4) \geq 2.0$      Inequality (15);

$TTL/EFL \leq 11.0$      Inequality (16);

$TTL/T\max \leq 6.5$      Inequality (17);

$(G23+G34)/T2 \leq 2.4$      Inequality (18); and/or $(T3+T4)/EFL \leq 3.4$      Inequality (19).

In some example embodiments, more details about the convex or concave surface structure, refracting power, etc. could be incorporated for one specific lens element or broadly for plural lens elements to enhance the control for the system performance and/or resolution. The material of the lens element(s) may be any kind of transparent material, such as glass for at least two lens elements. It is noted that the details listed here could be incorporated in example embodiments so long as no inconsistency occurs.

The above example embodiments are not limited and could be selectively incorporated in other embodiments described herein.

Through controlling the convex or concave shape of the surfaces and at least one inequality, the optical imaging lens in example embodiments may achieve good imaging quality, effectively shorten the length, broaden the HFOV of the optical imaging lens, and exhibit good thermal stability.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIG. 3 depicts a cross-sectional view showing the relation between the shape of a portion and the effective radius of a first example;

FIG. 4 depicts a cross-sectional view showing the relation between the shape of a portion and the effective radius of a second example;

FIG. 5 depicts a cross-sectional view showing the relation between the shape of a portion and the effective radius of a third example;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 48 depicts a table of optical data for each lens element of the optical imaging lens of an eleventh embodiment of the present disclosure;

FIG. 49 depicts a table of aspherical data of an eleventh embodiment of the optical imaging lens according to the present disclosure;

FIG. 52 depicts a table of optical data for each lens element of the optical imaging lens of a twelfth embodiment of the present disclosure;

FIG. 53 depicts a table of aspherical data of a twelfth embodiment of the optical imaging lens according to the present disclosure;

FIG. 56 depicts a table of optical data for each lens element of the optical imaging lens of a thirteenth embodiment of the present disclosure;

FIG. 57 depicts a table of aspherical data of a thirteenth embodiment of the optical imaging lens according to the present disclosure;

FIGS. 58A and 58B depict a table for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of all thirteen example embodiments.

DETAILED DESCRIPTION

Figure 6:
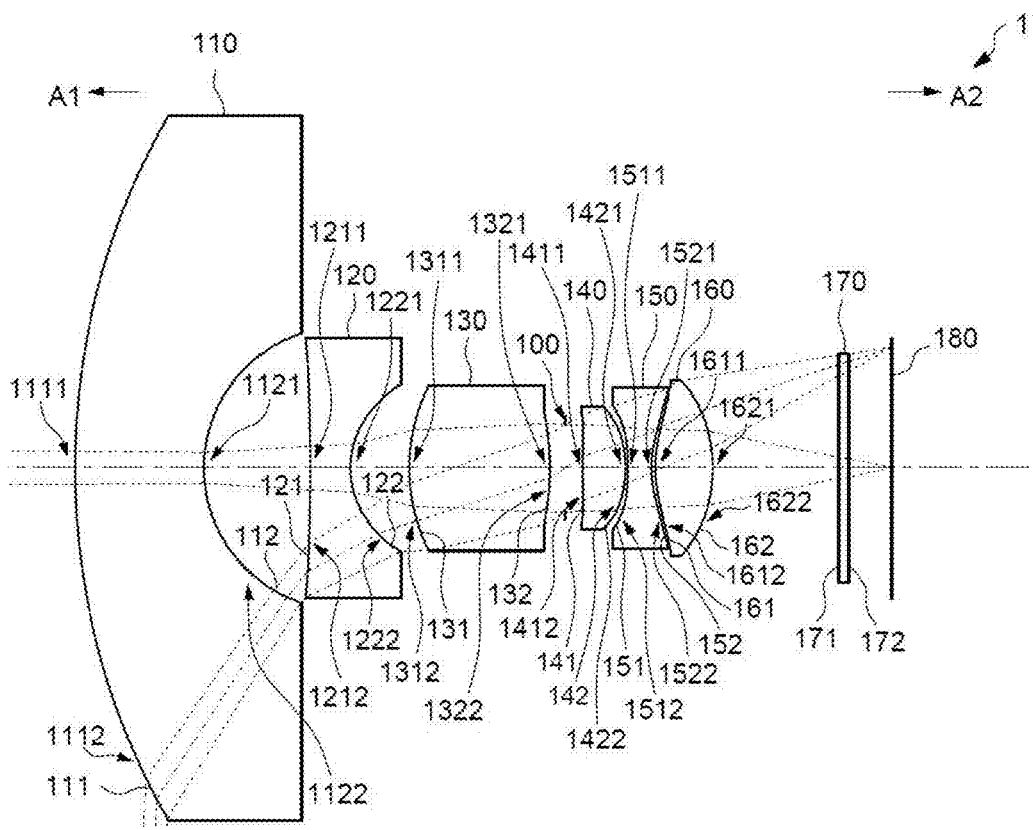
FIG. 6 depicts a cross-sectional view of a first embodiment of an optical imaging lens having six lens elements according to the present disclosure.

For a more complete understanding of the present disclosure and its advantages, reference is now made to the following description, taken in conjunction with the accompanying drawings, in which like reference numbers indicate like features. Persons having ordinary skill in the art will understand other varieties for implementing example embodiments, including those described herein. The drawings are not limited to a specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those described portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended, and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to determine whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point may exist on the object-side surface (within the clear aperture) of a lens element. In an example embodiment, portion I may be the portion in a vicinity of the optical axis, and portion III may be the portion in a vicinity of a periphery of the lens element. The portion in a vicinity of the optical axis may have a convex shape because the R value at the object-side surface of the lens element is positive. The portion in a vicinity of a periphery of the lens element (portion III) may have a convex shape. Further, there may be another portion having a concave shape existing between the first and second transition point (portion II).

Referring to a third example depicted in FIG. 5, in some embodiments, no transition point may exist on the object-side surface of the lens element. In such case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

In the present disclosure, examples of an optical imaging lens which is a prime lens are provided. Example embodiments of an optical imaging lens may comprise at least a first lens element, a second lens element, a third lens element, a fourth lens element, a fifth lens element and a sixth lens element. In some example embodiments, an optical imaging lens may comprise a seventh lens element. Each of the lens elements may comprise refracting power, an object-side surface facing toward an object side and an image-side surface facing toward an image side and a central thickness defined along the optical axis. These lens elements may be arranged sequentially from the object side to the image side along an optical axis. Through controlling the convex or concave shape of the surfaces and at lease one inequality, the optical imaging lens in example embodiments achieve good imaging quality and effectively broaden the HFOV, shorten the length of the optical imaging lens and provide good thermal stability.

Preferably, the lens elements are designed in light of the optical characteristics and the length of the optical imaging lens. For example, the negative refracting power of the first lens element, the concave portion in a vicinity of the optical axis formed on the object-side surface of the second lens element and the concave portion in a vicinity of the optical axis formed on the image-side surface of the second lens element may assist in enlarging the HFOV angle. The convex portion in a vicinity of the periphery formed on the image-side surface of the fourth lens element, the concave portion in a vicinity of the optical axis formed on the object-side surface of the fifth lens element, the convex portion in a vicinity of the optical axis formed on the object-side surface of the sixth lens element and the convex portion in a vicinity of the periphery formed on the image-side surface of the sixth lens element may assist in adjusting the aberration. When Tmax/Tmin≥6.0 is satisfied, the length of the optical imaging lens may be shortened effectively and the imaging quality may be sustained; preferably, the value of Tmax/Tmin is within 6.0~28.0. When choosing plastic material to construct a lens element, the cost and weight of the lens element may be lowered; however, to achieve a good thermal stability, at least two lens elements may be constructed by glass material.

To shorten the length of the optical imaging lens, the thickness of the lens elements and/or the air gaps between the lens elements are required optionally for shorter distances; however, considering the difficulty to achieve the smaller dimensions of the optical imaging lens set forth herein while maintaining imaging quality, the optical imaging lens may be better configured if it satisfies at least one Inequality as follows:

$T3/T2 \geq 3.5$            Inequality (2);

$TTL/(T1+T2) \leq 11.0$            Inequality (3);

$(T1+T4)/EFL \leq 2.1$ Inequality (4);

$(G12+G23)/T1 \leq 4.5$ Inequality (5);

$T3/(G23+G34) \geq 1.4$ Inequality (6);

$(G12+G34)/EFL \leq 1.7$ Inequality (7);

$(T2+T3)/T4 \geq 2.4$ Inequality (8);

$(T1+T2+T3)/(G12+G23+G34) \geq 1.0$ Inequality (9);

$TTL/(T3+T4) \leq 4.7$ Inequality (10);

$(T1+G12)/(T2+G23) \geq 2.0$ Inequality (11);

$Tmax/(G12+G34) \geq 0.9$ Inequality (12);

$EFL/Tmin \geq 3.5$ Inequality (13);

$T1/T4 \geq 1.3$ Inequality (14);

$(G12+G23)/(T2+T4) \geq 2.0$ Inequality (15);

$TTL/EFL \leq 11.0$ Inequality (16);

$TTL/Tmax \leq 6.5$ Inequality (17);

$(G23+G34)/T2 \leq 2.4$ Inequality (18); and/or $(T3+T4)/EFL \leq 3.4$ Inequality (19).

Preferably, $8.5 \geq T3/T2 \geq 3.5$; $4.5 \leq TTL/(T1+T2) \leq 11.0$; $0.8 \leq (T1+T4)/EFL \leq 2.1$; $1.0 \leq (G12+G23)/T1 \leq 4.5$; $4.6 \geq T3/(G23+G34) \geq 1.4$; $1.0 \leq (G12+G34)/EFL \leq 1.7$; $9.5 \geq (T2+T3)/T4 \geq 2.4$; $2.5 \geq (T1+T2+T3)/(G12+G23+G34) \geq 1.0$; $2.9 \leq TTL/(T3+T4) \leq 4.7$; $3.6 \geq (T1+G12)/(T2+G23) \geq 2.0$; $2.3 \geq Tmax/(G12+G34) \geq 0.9$; $11.5 \geq EFL/Tmin \geq 3.5$; $6.0 \geq T1/T4 \geq 1.3$; $3.3 \geq (G12+G23)/(T2+T4) \geq 2.0$; $8.0 \leq TTL/EFL \leq 11.0$; $3.3 \leq TTL/Tmax \leq 6.5$; $1.7 \leq (G23+G34)/T2 \leq 2.4$ and/or $1.8 \leq (T3+T4)/EFL \leq 3.4$.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface or refracting power could be incorporated for one specific lens element or broadly for plural lens elements to enhance the control for the system performance and/or resolution, or promote the yield. For example, in an example embodiment, at least two lens elements may be glass lens elements. It is noted that the details listed here could be incorporated in example embodiments if no inconsistency occurs.

Figure 7:
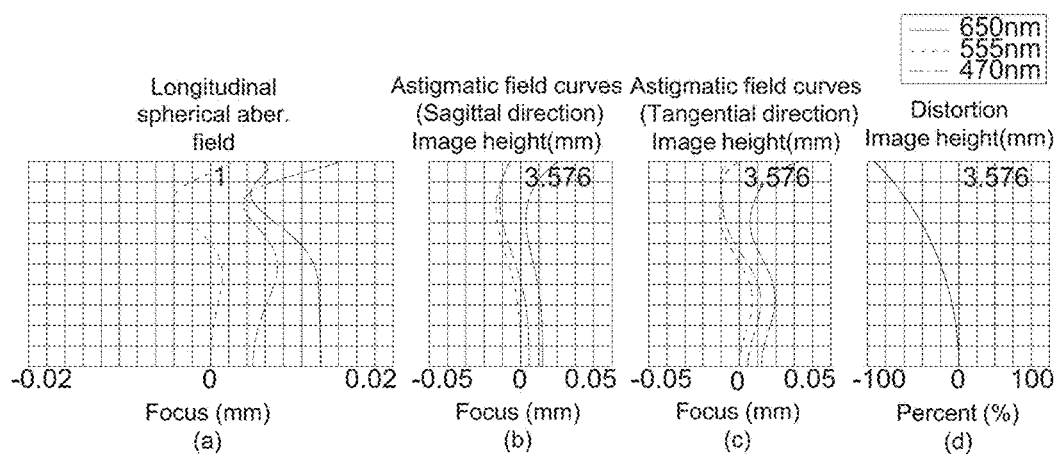
FIG. 7 depicts a chart of longitudinal spherical aberration and other kinds of optical aberrations of a first embodiment of the optical imaging lens according to the present disclosure.

Several example embodiments and associated optical data will now be provided for illustrating example embodiments of an optical imaging lens with short length, good optical characteristics, good thermal stability, a wide view angle and/or a low f-number. Reference is now made to FIGS. 6-9. FIG. 6 illustrates an example cross-sectional view of an optical imaging lens 1 having six lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, a third lens element 130, an aperture stop 100, a fourth lens element 140, a fifth lens element 150 and a sixth lens element 160. A filtering unit 170 and an image plane 180 of an image sensor are positioned at the image side A2 of the optical lens 1. Each of the first, second, third, fourth, fifth and sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The filtering unit 170, positioned between the sixth lens element 160 and the image plane 180, selectively absorbs light with specific wavelength from the light passing optical imaging lens 1. For example, a band of infrared light may be absorbed, and this may prohibit the band of light from producing an image on the image plane 180.

Please note that during the normal operation of the optical imaging lens 1, the distance between any two adjacent lens elements of the first, second, third, fourth, fifth and sixth lens elements 110, 120, 130, 140, 150, 160 is a unchanged value, i.e. the optical imaging lens 1 is a prime lens.

Example embodiments of each lens element of the optical imaging lens 1 which may be constructed by glass, plastic material or other transparent material will now be described with reference to the drawings.

An example embodiment of the first lens element 110, which may be constructed by glass material, may have negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which may be constructed by plastic material, may have negative refracting power. The object-side surface 121 may be a concave surface comprising a concave portion 1211 in a vicinity of the optical axis and a concave portion 1212 in a vicinity of a periphery of the second lens element 120. The image-side surface 122 may be a concave surface comprising a concave portion 1221 in a vicinity of the optical axis and a concave portion 1222 in a vicinity of the periphery of the second lens element 120.

An example embodiment of the third lens element 130, which may be constructed by glass material, may have positive refracting power. The object-side surface 131 may be a convex surface comprising a convex portion 1311 in a vicinity of the optical axis and a convex portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140, which may be constructed by plastic material, may have positive refracting power. The object-side surface 141 may comprise a convex portion 1411 in a vicinity of the optical axis and a concave portion 1412 in a vicinity of a periphery of the fourth lens element 140. The image-side surface 142 may be a convex surface comprising a convex portion 1421 in a vicinity of the optical axis and a convex portion 1422 in a vicinity of the periphery of the fourth lens element 140.

An example embodiment of the fifth lens element 150, which may be constructed by plastic material, may have negative refracting power. The object-side surface 151 may be a concave surface comprising a concave portion 1511 in a vicinity of the optical axis and a concave portion 1512 in a vicinity of a periphery of the fifth lens element 150. The image-side surface 152 may be a concave surface comprising a concave portion 1521 in a vicinity of the optical axis and a concave portion 1522 in a vicinity of the periphery of the fifth lens element 150.

An example embodiment of the sixth lens element 160, which may be constructed by plastic material, may have positive refracting power. The object-side surface 161 may be a convex surface comprising a convex portion 1611 in a vicinity of the optical axis and a convex portion 1612 in a vicinity of a periphery of the sixth lens element 160. The image-side surface 162 may be a convex surface comprising a convex portion 1621 in a vicinity of the optical axis and a convex portion 1622 in a vicinity of the periphery of the sixth lens element 160.

In example embodiments, air gaps may exist between each pair of adjacent lens elements, as well as between the sixth lens element 160 and the filtering unit 170, and the filtering unit 170 and the image plane 180 of the image sensor. Please note, in other embodiments, any of the aforementioned air gaps may or may not exist. For example, the profiles of opposite surfaces of any two adjacent lens elements may correspond to each other, and in such situations, the air gap may not exist.

FIG. 8 depicts the optical characteristics of each lens elements in the optical imaging lens 1 of the present embodiment, and please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL corresponding to the present embodiment. Please note that the distance between the third lens element 130 and the center of the aperture stop 100 along the optical axis is represented by G34-TA here.

Here, the object-side surface 111 and the image-side surface 112 of the first lens element 110 and the object-side surface 131 and the image-side surface 132 of the third lens element 130 are exemplary spherical surfaces. The aspherical surfaces, including the object-side surface 121 and the image-side surface 122 of the second lens element 120, the object-side surface 141 and the image-side surface 142 of the fourth lens element 140, the object-side surface 151 and the image-side surface 152 of the fifth lens element 150 and the object-side surface 161 and the image-side surface 162 of the sixth lens element 160, are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_{2i}$ represents an aspherical coefficient of $2i^{th}$ level. The values of each aspherical parameter are shown in FIG. 9.

Please refer to FIG. 7(a), longitudinal spherical aberration of the optical imaging lens in the present embodiment is shown in coordinates in which the horizontal axis represents focus and the vertical axis represents field of view, and FIG. 7(b), astigmatism aberration of the optical imaging lens in the present embodiment in the sagittal direction is shown in coordinates in which the horizontal axis represents focus and the vertical axis represents image height, and FIG. 7(c), astigmatism aberration in the tangential direction of the optical imaging lens in the present embodiment is shown in coordinates in which the horizontal axis represents focus and the vertical axis represents image height, and FIG. 7(d), distortion aberration of the optical imaging lens in the present embodiment is shown in coordinates in which the horizontal axis represents percentage and the vertical axis represents image height. The curves of different wavelengths (470 nm, 555 nm, 650 nm) are closed to each other. This represents that off-axis light with respect to these wavelengths is focused around an image point. From the vertical deviation of each curve shown therein, the offset of the off-axis light relative to the image point may be within about ±0.02 mm. Therefore, the present embodiment improves the longitudinal spherical aberration with respect to different wavelengths. For astigmatism aberration in the sagittal direction, the focus variation with respect to the three wavelengths in the whole field may fall within about ±0.03 mm, for astigmatism aberration in the tangential direction, the focus variation with respect to the three wavelengths in the whole field may fall within about ±0.04 mm, and the variation of the distortion aberration may be within about ±100%.

According to the value of the aberrations, it is shown that the optical imaging lens 1 of the present embodiment, with the length as short as about 24.058 mm, may be capable of providing good imaging quality as well as good optical characteristics. Further, with the assumption that the focal shift is set as 0 mm at a reference temperature, 20° C., the focal shift of the optical imaging lens 1 of the present embodiment at about 50° C. may only be about −0.011 mm. One of ordinary skill in the art having the benefit of the present disclosure would appreciate that such an embodiment exhibits desirable and advantageous thermal stability.

Figure 10:
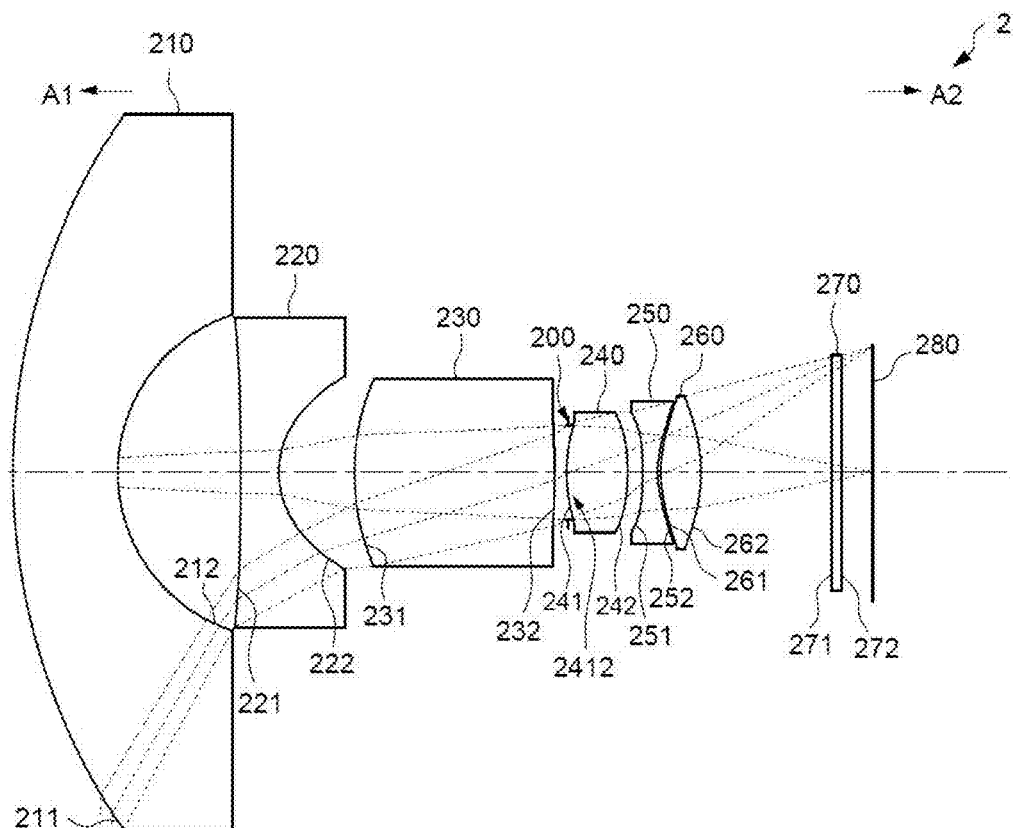
FIG. 10 depicts a cross-sectional view of a second embodiment of an optical imaging lens having six lens elements according to the present disclosure.
Figure 11:
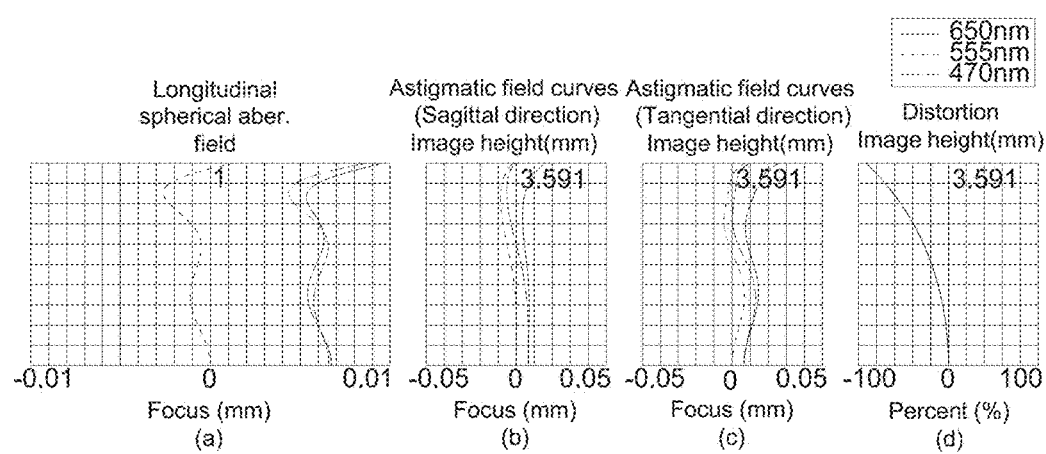
FIG. 11 depicts a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having six lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, a third lens element 230, an aperture stop 200, a fourth lens element 240, a fifth lens element 250 and a sixth lens element 260.

The differences between the second embodiment and the first embodiment may include the radius of curvature, thickness of each lens element, the distance of each air gap, aspherical data, related optical parameters, such as back focal length, and the configuration of the concave/convex shape of the object-side surface 241, but the configuration of the concave/convex shape of surfaces, comprising the object-side surfaces 211, 221, 231, 251, 261 facing to the object side A1 and the image-side surfaces 212, 222, 232, 242, 252, 262 facing to the image side A2, are similar to those in the first embodiment. Here and in the embodiments hereinafter, for clearly showing the drawings of the present embodiment, only the surface shapes which are different from that in the first embodiment are labeled. Specifically, the difference of configuration of surface shape may include: the object-side surface 241 of the fourth lens element 240 may be a convex surface further comprising a convex portion 2412 in a vicinity of a periphery of the fourth lens element 240. Please refer to FIG. 12 for the optical characteristics of each lens elements in the optical imaging lens 2 the present embodiment, and please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 11(a), the offset of the off-axis light relative to the image point may be within about ±0.01 mm. As the astigmatism aberration in the sagittal direction shown in FIG. 11(b), the focus variation with regard to the three wavelengths in the whole field may fall within about ±0.03 mm. As the astigmatism aberration in the tangential direction shown in FIG. 11(c), the focus variation with regard to the three wavelengths in the whole field may fall within about ±0.03 mm. As shown in FIG. 11(d), the variation of the distortion aberration may be within about ±100%. Compared with the first embodiment, the longitudinal spherical aberration and astigmatism aberration in the tangential direction of the optical imaging lens 2 are less.

According to the value of the aberrations, it is shown that the optical imaging lens 2 of the present embodiment, with the length as short as about 24.466 mm, may be capable of providing good imaging quality. Further, with the assumption that the focal shift is set as 0 mm at a reference temperature, 20° C., the focal shift of the optical imaging lens 2 of the present embodiment at about 50° C. may only be about 0.013 mm. One of ordinary skill in the art having the benefit of the present disclosure would appreciate that an embodiment demonstrates desirable and advantageous thermal stability.

Figure 14:
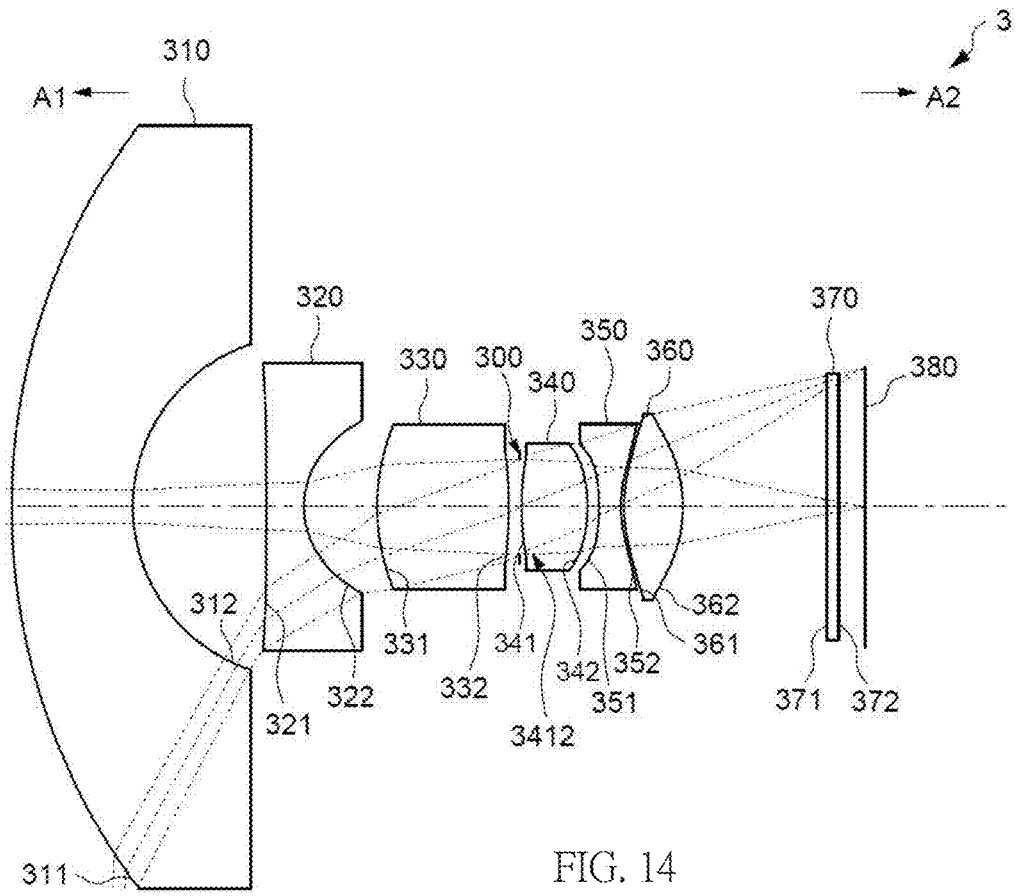
FIG. 14 depicts a cross-sectional view of a third embodiment of an optical imaging lens having six lens elements according to the present disclosure.
Figure 15:
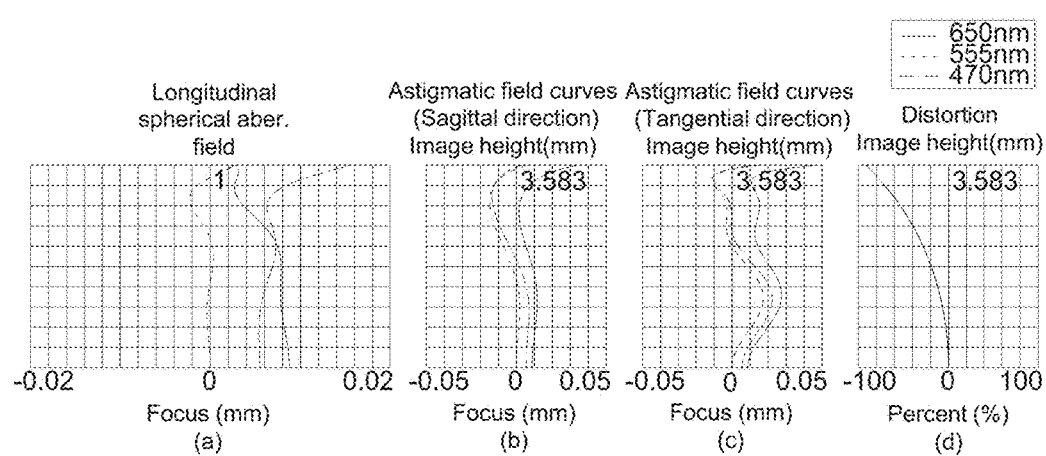
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, a third lens element 330, an aperture stop 300, a fourth lens element 340, a fifth lens element 350 and a sixth lens element 360.

The differences between the third embodiment and the first embodiment may include the radius of curvature and thickness of each lens element, the distance of each air gap, aspherical data, related optical parameters, such as back focal length, and the configuration of the concave/convex shape of the object-side surfaces 341, but the configuration of the concave/convex shape of surfaces, comprising the object-side surfaces 311, 321, 331, 351, 361 facing to the object side A1 and the image-side surfaces 312, 322, 332, 342, 352, 362 facing to the image side A2, are similar to those in the first embodiment. Specifically, the difference of configuration of surface shape may include: the object-side surface 341 of the fourth lens element 340 may be a convex surface further comprising a convex portion 3412 in a vicinity of a periphery of the fourth lens element 340. Please refer to FIG. 16 for the optical characteristics of each lens elements in the optical imaging lens 3 of the present embodiment, and please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 15(a), the offset of the off-axis light relative to the image point may be within about +0.02 mm. As the astigmatism aberration in the sagittal direction shown in FIG. 15(b), the focus variation with regard to the three wavelengths in the whole field may fall within about ±0.04 mm. As the astigmatism aberration in the tangential direction shown in FIG. 15(c), the focus variation with regard to the three wavelengths in the whole field may fall within about ±0.05 mm. As shown in FIG. 15(d), the variation of the distortion aberration may be within about ±100%.

According to the value of the aberrations, it is shown that the optical imaging lens 3 of the present embodiment, with the length as short as about 21.978 mm, which is shorter than what is shown in the first embodiment, may be capable of providing good imaging quality. Further, with the assumption that the focal shift is set as 0 mm at a reference temperature, 20° C., the focal shift of the optical imaging lens 3 of the present embodiment at about 50° C. may only be about −0.002 mm. One of ordinary skill in the art having the benefit of the present disclosure would appreciate that such an embodiment exhibits desirable and advantageous thermal stability.

Figure 18:
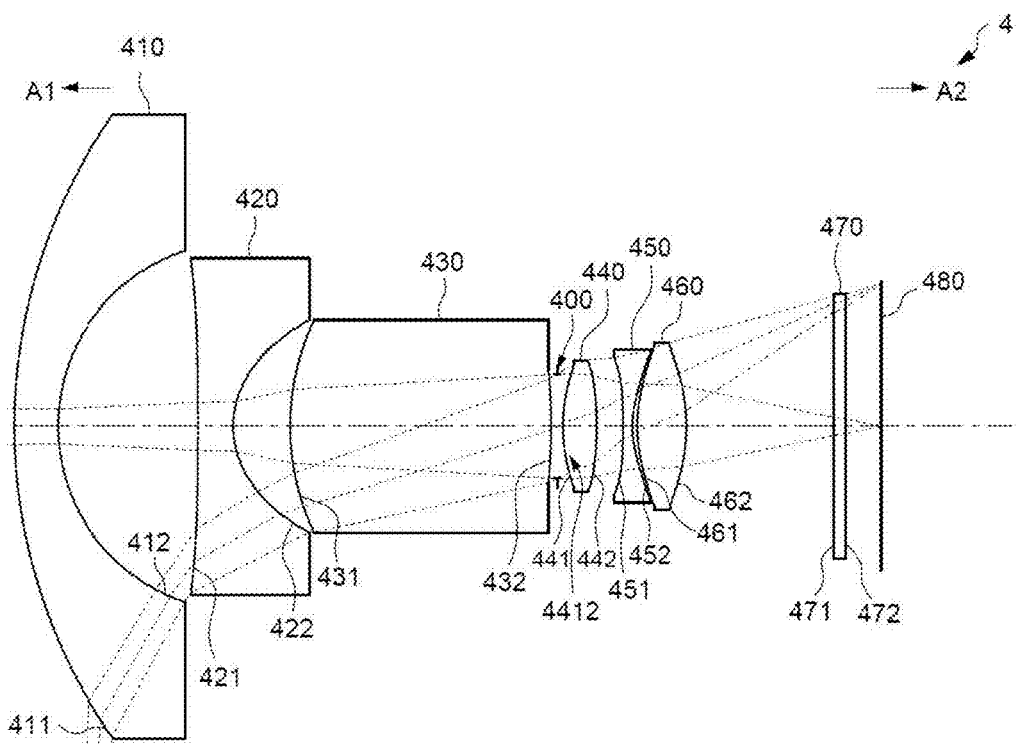
FIG. 18 depicts a cross-sectional view of a fourth embodiment of an optical imaging lens having six lens elements according to the present disclosure.
Figure 19:
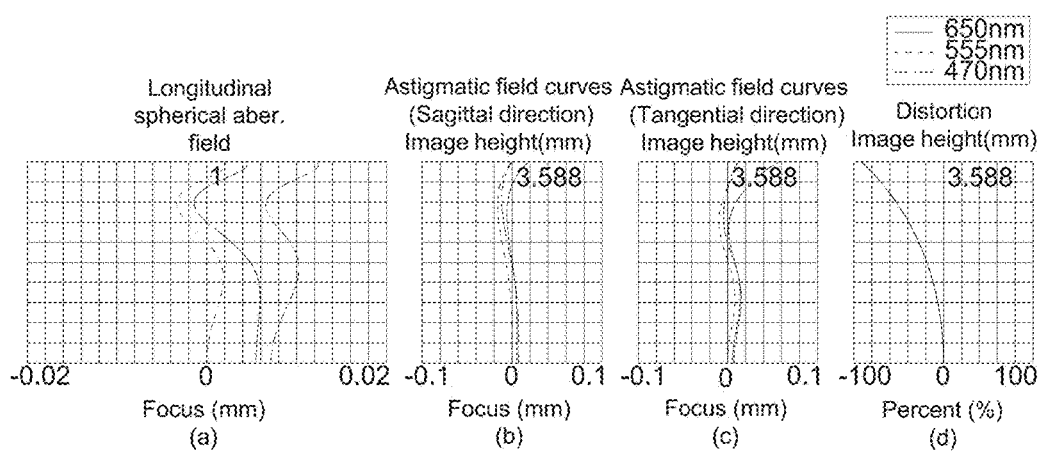
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, a third lens element 430, an aperture stop 400, a fourth lens element 440, a fifth lens element 450 and a sixth lens element 460.

The differences between the fourth embodiment and the first embodiment may include the radius of curvature and thickness of each lens element, the distance of each air gap, aspherical data, related optical parameters, such as back focal length, and the configuration of the concave/convex shape of the object-side surface 441, but the configuration of the concave/convex shape of surfaces, comprising the object-side surfaces 411, 421, 431, 451, 461 facing to the object side A1 and the image-side surfaces 412, 422, 432, 442, 452, 462 facing to the image side A2, are similar to those in the first embodiment. Specifically, the difference of configuration of surface shape may include: the object-side surface 441 of the fourth lens element 440 may be a convex surface further comprising a convex portion 4412 in a vicinity of a periphery of the fourth lens element 440. Please refer to FIG. 20 for the optical characteristics of each lens elements in the optical imaging lens 4 of the present embodiment, please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 19(a), the offset of the off-axis light relative to the image point may be within about +0.02 mm. As the astigmatism aberration in the sagittal direction shown in FIG. 19(b), the focus variation with regard to the three wavelengths in the whole field may fall within about ±0.02 mm. As the astigmatism aberration in the tangential direction shown in FIG. 19(c), the focus variation with regard to the three wavelengths in the whole field may fall within about ±0.06 mm. As shown in FIG. 19(d), the variation of the distortion aberration may be within about ±100%. Compared with the first embodiment, the astigmatism aberration in the tangential direction of the optical imaging lens 4 is less.

According to the value of the aberrations, it is shown that the optical imaging lens 4 of the present embodiment, with the length as short as about 21.838 mm, which is shorter than what is shown in the first embodiment, may be capable of providing good imaging quality. Further, with the assumption that the focal shift is set as 0 mm at a reference temperature, 20° C., the focal shift of the optical imaging lens 4 of the present embodiment at about 50° C. may only be about 0.012 mm. One of ordinary skill in the art having the benefit of the present disclosure would appreciate that such an embodiment exhibits desirable and advantageous thermal stability.

Figure 22:
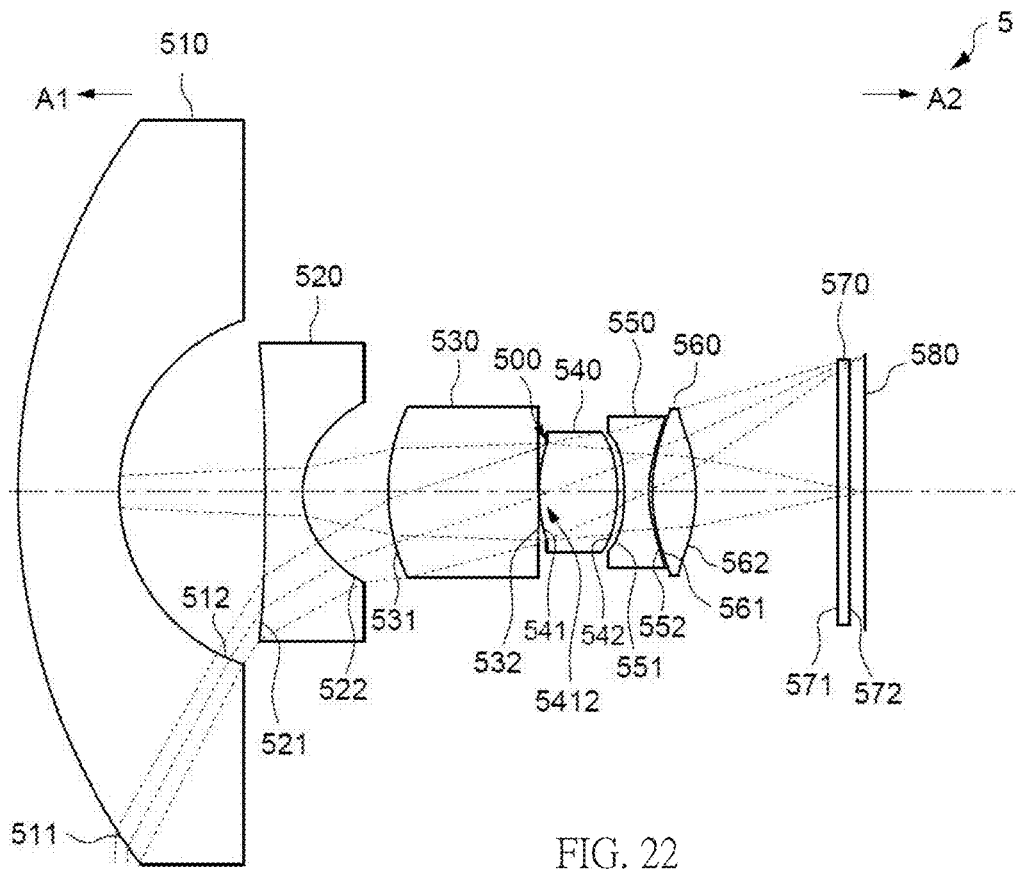
FIG. 22 depicts a cross-sectional view of a fifth embodiment of an optical imaging lens having six lens elements according to the present disclosure.
Figure 23:
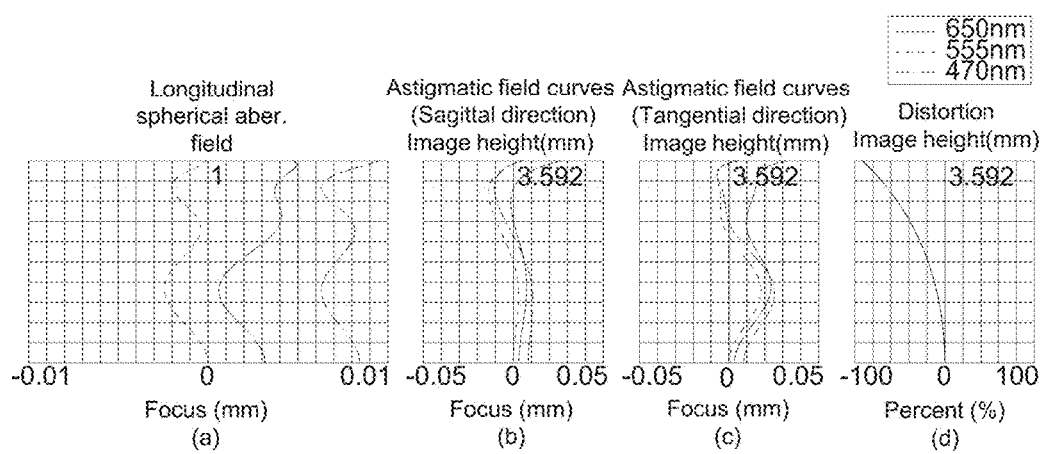
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, a third lens element 530, an aperture stop 500, a fourth lens element 540, a fifth lens element 550 and a sixth lens element 560.

The differences between the fifth embodiment and the first embodiment may include the radius of curvature and thickness of each lens element, the distance of each air gap, aspherical data, related optical parameters, such as back focal length, and the configuration of the concave/convex shape of the object-side surface 541, but the configuration of the concave/convex shape of surfaces, comprising the object-side surfaces 511, 521, 531, 551, 561 facing to the object side A1 and the image-side surfaces 512, 522, 532, 542, 552, 562 facing to the image side A2, are similar to those in the first embodiment. Specifically, the difference of configuration of surface shape may include: the object-side surface 541 of the fourth lens element 540 may be a convex surface further comprising a convex portion 5412 in a vicinity of a periphery of the fourth lens element 540. Please refer to FIG. 24 for the optical characteristics of each lens elements in the optical imaging lens 5 of the present embodiment, please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 23(a), the offset of the off-axis light relative to the image point may be within about ±0.01 mm. As the astigmatism aberration in the sagittal direction shown in FIG. 23(b), the focus variation with regard to the three wavelengths in the whole field may fall within about ±0.03 mm. As the astigmatism aberration in the tangential direction shown in FIG. 23(c), the focus variation with regard to the three wavelengths in the whole field may fall within about +0.048 mm. As shown in FIG. 23(d), the variation of the distortion aberration may be within about ±100%. Compared with the first embodiment, the longitudinal spherical aberration of the optical imaging lens 5 is less.

According to the value of the aberrations, it is shown that the optical imaging lens 5 of the present embodiment, with the length as short as about 22.161 mm, which is shorter than what is shown in the first embodiment, may be capable of providing good imaging quality. Further, with the assumption that the focal shift is set as 0 mm at a reference temperature, 20° C., the focal shift of the optical imaging lens 5 of the present embodiment at about 50° C. may only be about 0.004 mm. One of ordinary skill in the art having the benefit of the present disclosure would appreciate that such an embodiment exhibits desirable and advantageous thermal stability.

Figure 26:
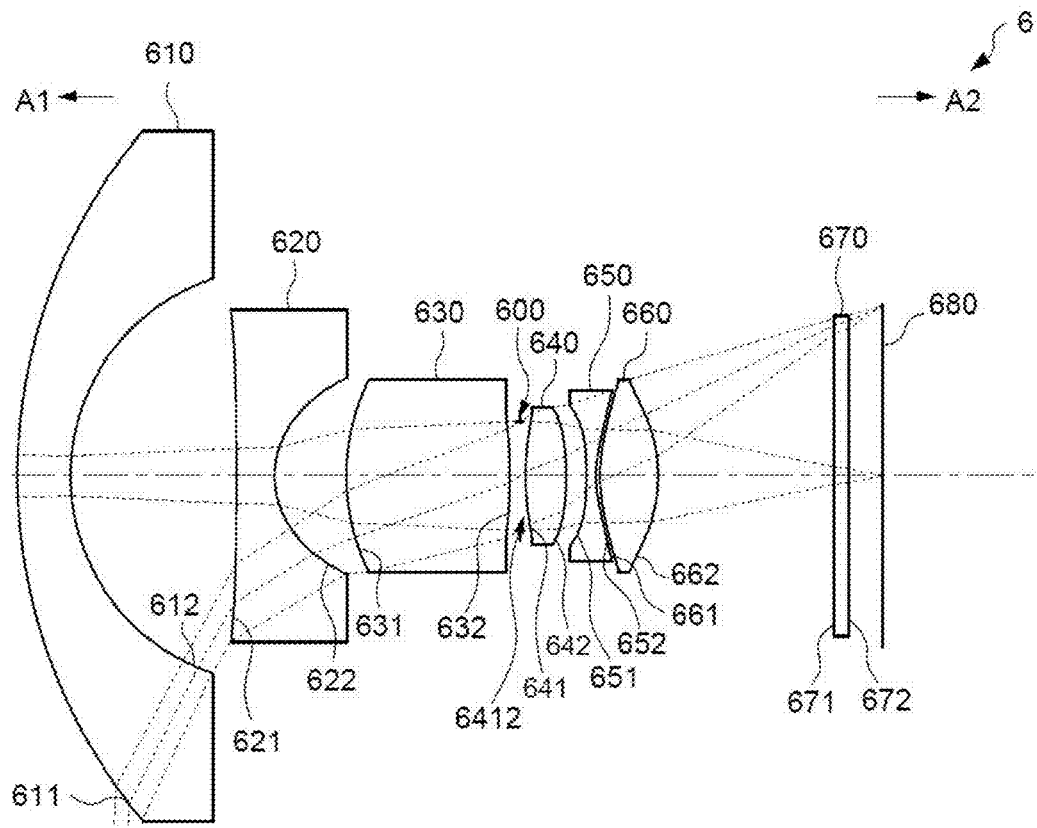
FIG. 26 depicts a cross-sectional view of a sixth embodiment of an optical imaging lens having six lens elements according to the present disclosure.
Figure 27:
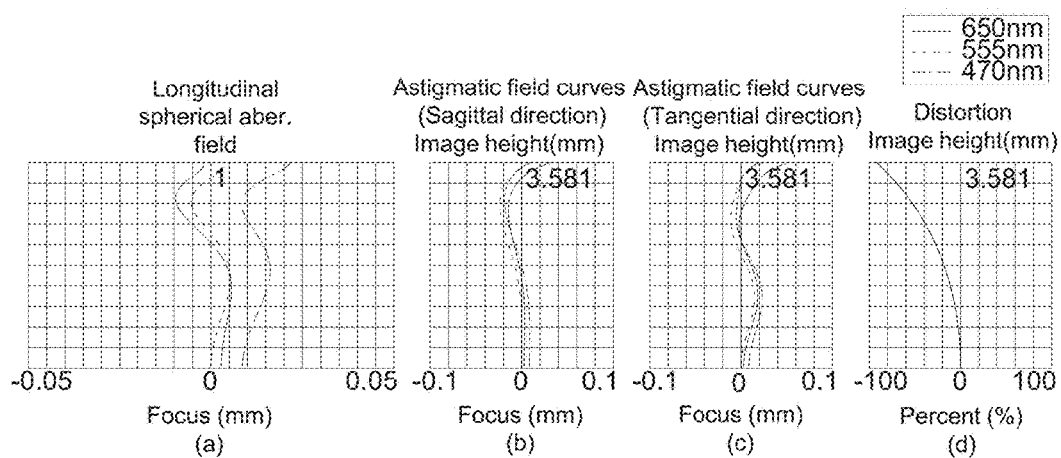
FIG. 27 depicts a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having six lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, a third lens element 630, an aperture stop 600, a fourth lens element 640, a fifth lens element 650 and a sixth lens element 660.

The differences between the sixth embodiment and the first embodiment may include the radius of curvature and thickness of each lens element, the distance of each air gap, aspherical data, related optical parameters, such as back focal length, and the configuration of the concave/convex shape of the object-side surface 641, but the configuration of the concave/convex shape of surfaces, comprising the object-side surfaces 611, 621, 631, 651, 661 facing to the object side A1 and the image-side surfaces 612, 622, 632, 642, 652, 662 facing to the image side A2, are similar to those in the first embodiment. Specifically, the difference of configuration of surface shape may include: the object-side surface 641 of the fourth lens element 640 may be a convex surface further comprising a convex portion 6412 in a vicinity of a periphery of the fourth lens element 640. Please refer to FIG. 28 for the optical characteristics of each lens elements in the optical imaging lens 6 of the present embodiment, please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 27(a), the offset of the off-axis light relative to the image point may be within about +0.03 mm. As the astigmatism aberration in the sagittal direction shown in FIG. 27(b), the focus variation with regard to the three wavelengths in the whole field may fall within about ±0.04 mm. As the astigmatism aberration in the tangential direction shown in FIG. 27(c), the focus variation with regard to the three wavelengths in the whole field may fall within about ±0.06 mm. As shown in FIG. 27(d), the variation of the distortion aberration may be within about ±100%.

According to the value of the aberrations, it is shown that the optical imaging lens 6 of the present embodiment, with the length as short as about 18.152 mm, which is shorter than what is shown in the first embodiment, may be capable of providing good imaging quality. Further, with the assumption that the focal shift is set as 0 mm at a reference temperature, 20° C., the focal shift of the optical imaging lens 6 of the present embodiment at about 50° C. may only be about −0.004 mm only. One of ordinary skill in the art having the benefit of the present disclosure would appreciate that such an embodiment exhibits desirable and advantageous thermal stability.

Figure 30:
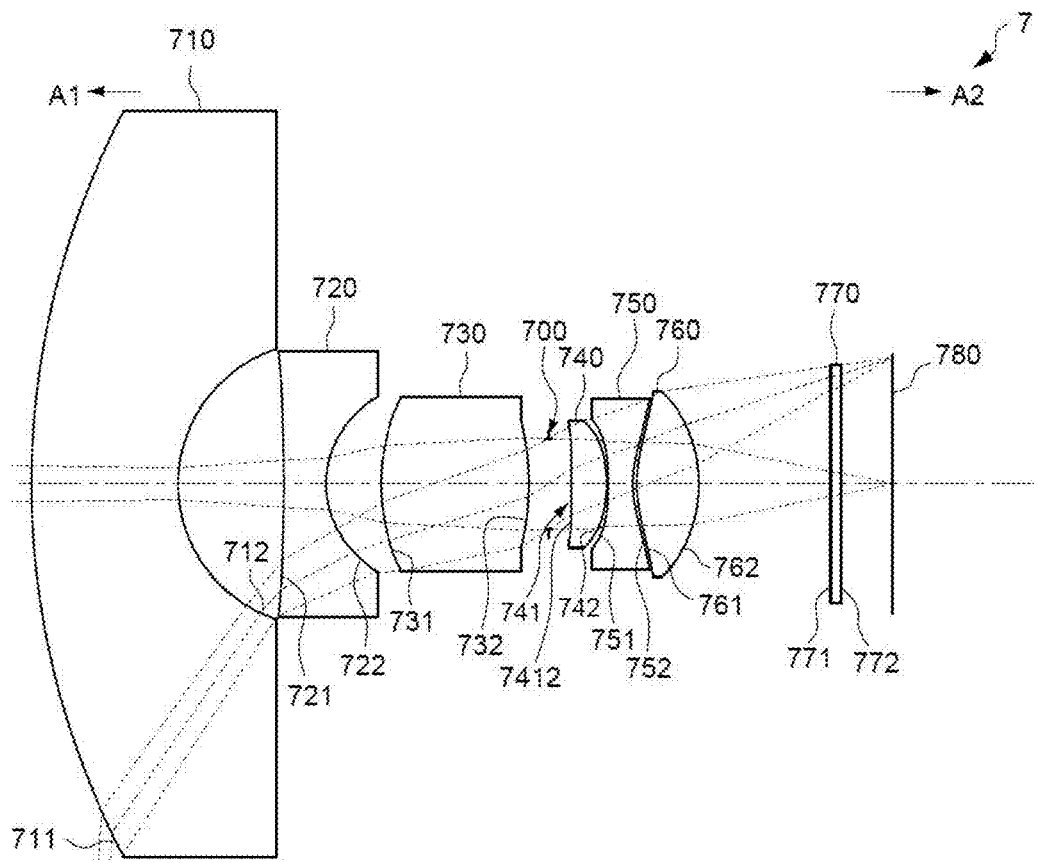
FIG. 30 depicts a cross-sectional view of a seventh embodiment of an optical imaging lens having six lens elements according to the present disclosure.
Figure 31:
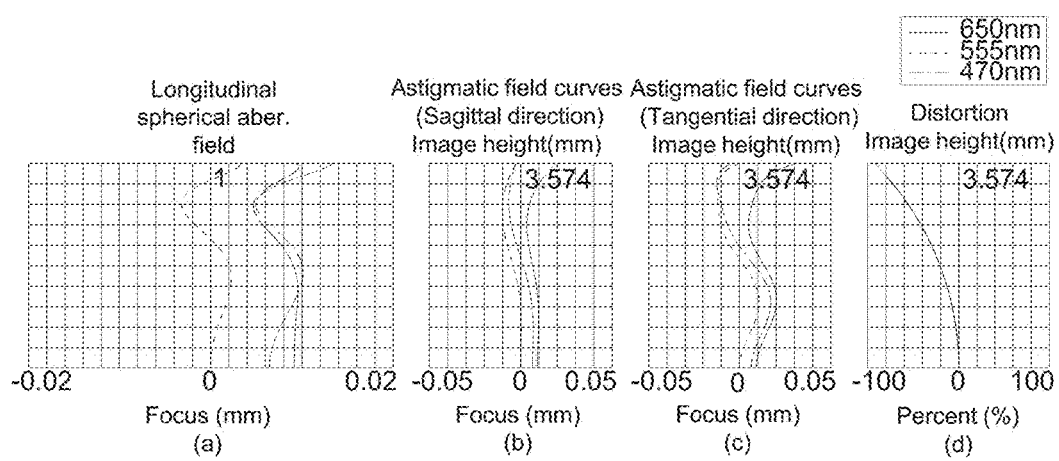
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, a third lens element 730, an aperture stop 700, a fourth lens element 740, a fifth lens element 750 and a sixth lens element 760.

The differences between the seventh embodiment and the first embodiment may include the radius of curvature and thickness of each lens element, the distance of each air gap, aspherical data and related optical parameters, such as back focal length, but the configuration of the concave/convex shape of surfaces, comprising the object-side surfaces 711, 721, 731, 741, 751, 761 facing to the object side A1 and the image-side surfaces 712, 722, 732, 742, 752, 762 facing to the image side A2, are similar to those in the first embodiment. Please refer to FIG. 32 for the optical characteristics of each lens elements in the optical imaging lens 7 of the present embodiment, please refer to FIG. 58A for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 31(a), the offset of the off-axis light relative to the image point may be within about +0.02 mm. As the astigmatism aberration in the sagittal direction shown in FIG. 31(b), the focus variation with regard to the three wavelengths in the whole field may fall within about ±0.03 mm. As the astigmatism aberration in the tangential direction shown in FIG. 31(c), the focus variation with regard to the three wavelengths in the whole field may fall within about ±0.04 mm. As shown in FIG. 31(d), the variation of the distortion aberration may be within about ±100%.

According to the value of the aberrations, it is shown that the optical imaging lens 7 of the present embodiment, with the length as short as about 24.269 mm, may be capable of providing good imaging quality. Further, with the assumption that the focal shift is set as 0 mm at a reference temperature, 20° C., the focal shift of the optical imaging lens 7 of the present embodiment at about 50° C. may only be about −0.013 mm. One of ordinary skill in the art having the benefit of the present disclosure would appreciate that such an embodiment exhibits desirable and advantageous thermal stability.

Figure 34:
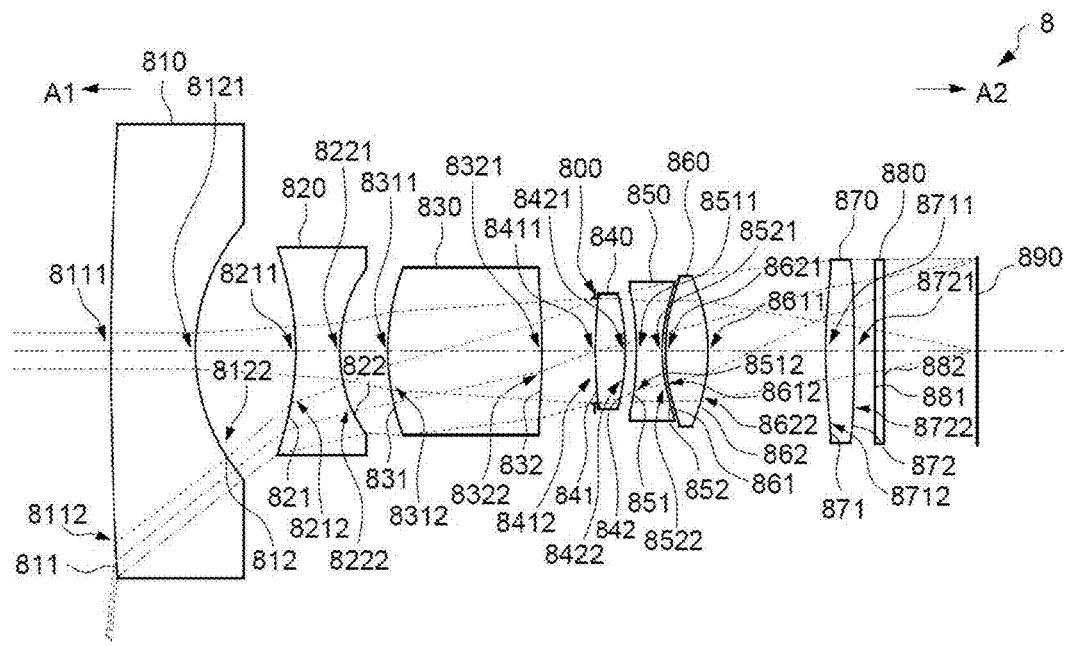
FIG. 34 depicts a cross-sectional view of an eighth embodiment of an optical imaging lens having seven lens elements according to the present disclosure.
Figure 35:
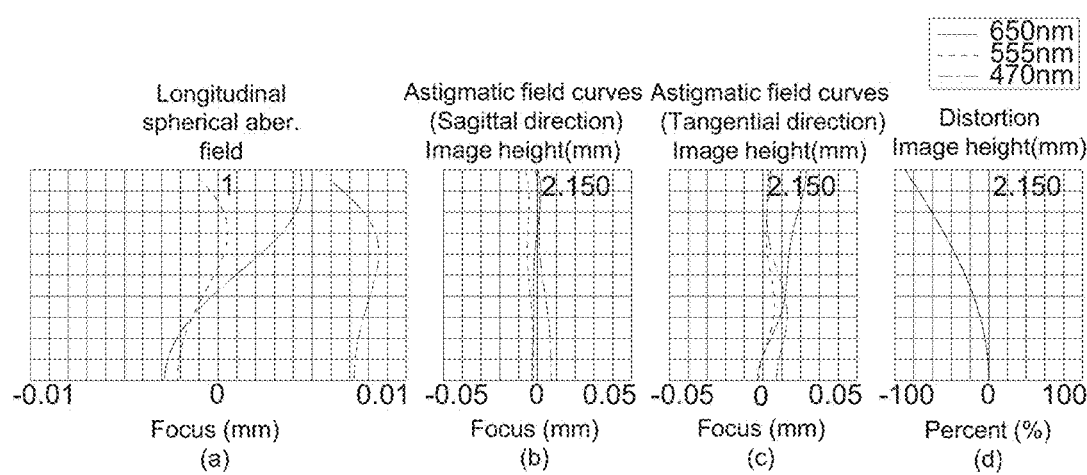
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having seven lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, a third lens element 830, an aperture stop 800, a fourth lens element 840, a fifth lens element 850, a sixth lens element 860 and a seventh lens element 870.

The differences between the eighth embodiment and the first embodiment may include number of the lens elements, the radius of curvature and thickness of each lens element, the distance of each air gap, aspherical data, related optical parameters, such as back focal length, and the configuration of the concave/convex shape of the object-side surface 841, but the configuration of the concave/convex shape of surfaces, comprising the object-side surfaces 811, 821, 831, 851, 861 facing to the object side A1 and the image-side surfaces 812, 822, 832, 842, 852, 862 facing to the image side A2, are similar to those in the first embodiment. Specifically, the optical imaging lens 8 of the present embodiment comprises the seventh lens element 870, the third lens element 830 is made from plastic and the fourth lens element 840 is made from glass.

An example embodiment of the first lens element 810, which may be constructed by glass material, may have negative refracting power. The object-side surface 811 may be a convex surface comprising a convex portion 8111 in a vicinity of the optical axis and a convex portion 8112 in a vicinity of a periphery of the first lens element 810. The image-side surface 812 may be a concave surface comprising a concave portion 8121 in a vicinity of the optical axis and a concave portion 8122 in a vicinity of the periphery of the first lens element 810.

An example embodiment of the second lens element 820, which may be constructed by plastic material, may have negative refracting power. The object-side surface 821 may be a concave surface comprising a concave portion 8211 in a vicinity of the optical axis and a concave portion 8212 in a vicinity of a periphery of the second lens element 820. The image-side surface 822 may be a concave surface comprising a concave portion 8221 in a vicinity of the optical axis and a concave portion 8222 in a vicinity of the periphery of the second lens element 820.

An example embodiment of the third lens element 830, which may be constructed by plastic material, may have positive refracting power. The object-side surface 831 may be a convex surface comprising a convex portion 8311 in a vicinity of the optical axis and a convex portion 8312 in a vicinity of a periphery of the third lens element 830. The image-side surface 832 may be a convex surface comprising a convex portion 8321 in a vicinity of the optical axis and a convex portion 8322 in a vicinity of the periphery of the third lens element 830.

An example embodiment of the fourth lens element 840, which may be constructed by glass material, may have positive refracting power. The object-side surface 841 may be a convex surface comprising a convex portion 8411 in a vicinity of the optical axis and a convex portion 8412 in a vicinity of a periphery of the fourth lens element 840. The image-side surface 842 may be a convex surface comprising a convex portion 8421 in a vicinity of the optical axis and a convex portion 8422 in a vicinity of the periphery of the fourth lens element 840.

An example embodiment of the fifth lens element 850, which may be constructed by plastic material, may have negative refracting power. The object-side surface 851 may be a concave surface comprising a concave portion 8511 in a vicinity of the optical axis and a concave portion 8512 in a vicinity of a periphery of the fifth lens element 850. The image-side surface 852 may be a concave surface comprising a concave portion 8521 in a vicinity of the optical axis and a concave portion 8522 in a vicinity of the periphery of the fifth lens element 850.

An example embodiment of the sixth lens element 860, which may be constructed by plastic material, may have positive refracting power. The object-side surface 861 may be a convex surface comprising a convex portion 8611 in a vicinity of the optical axis and a convex portion 8612 in a vicinity of a periphery of the sixth lens element 860. The image-side surface 862 may be a convex surface comprising a convex portion 8621 in a vicinity of the optical axis and a convex portion 8622 in a vicinity of the periphery of the sixth lens element 860.

An example embodiment of the seventh lens element 870, which may be constructed by plastic material, may have positive refracting power. The object-side surface 871 may be a convex surface comprising a convex portion 8711 in a vicinity of the optical axis and a convex portion 8712 in a vicinity of a periphery of the seventh lens element 870. The image-side surface 872 may be a convex surface comprising a convex portion 8721 in a vicinity of the optical axis and a convex portion 8722 in a vicinity of the periphery of the seventh lens element 870.

Here, the object-side surface 811 and the image-side surface 812 of the first lens element 810 and the object-side surface 841 and the image-side surface 842 of the fourth lens element 840 are exemplary spherical surfaces. The aspherical surfaces, including the object-side surface 821 and the image-side surface 822 of the second lens element 820, the object-side surface 831 and the image-side surface 832 of the third lens element 830, the object-side surface 851 and the image-side surface 852 of the fifth lens element 850, the object-side surface 861 and the image-side surface 862 of the sixth lens element 860 and the object-side surface 871 and the image-side surface 872 of the seventh lens element 870, are all defined by the aspherical formula as illustrated in the first embodiment.

Please refer to FIG. 36 for the optical characteristics of each lens elements in the optical imaging lens 8 of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 35(*a*), the offset of the off-axis light relative to the image point may be within about ±0.01 mm. As the astigmatism aberration in the sagittal direction shown in FIG. 35(*b*), the focus variation with regard to the three wavelengths in the whole field may fall within about ±0.01 mm. As the astigmatism aberration in the tangential direction shown in FIG. 35(*c*), the focus variation with regard to the three wavelengths in the whole field may fall within about ±0.03 mm. As shown in FIG. 35(*d*), the variation of the distortion aberration may be within about ±100%. Compared with the first embodiment, the longitudinal spherical aberration, astigmatism aberration both in the sagittal and tangential directions of the optical imaging lens 8 are less.

According to the value of the aberrations, it is shown that the optical imaging lens 8 of the present embodiment, with the length as short as about 20.156 mm, which is shorter than what is shown in the first embodiment, may be capable of providing good imaging quality. Further, with the assumption that the focal shift is set as 0 mm at a reference temperature, 20° C., the focal shift of the optical imaging lens 8 of the present embodiment at about 50° C. may only be about −0.008 mm only. One of ordinary skill in the art having the benefit of the present disclosure would appreciate that such an embodiment exhibits desirable and advantageous thermal stability.

Figure 38:
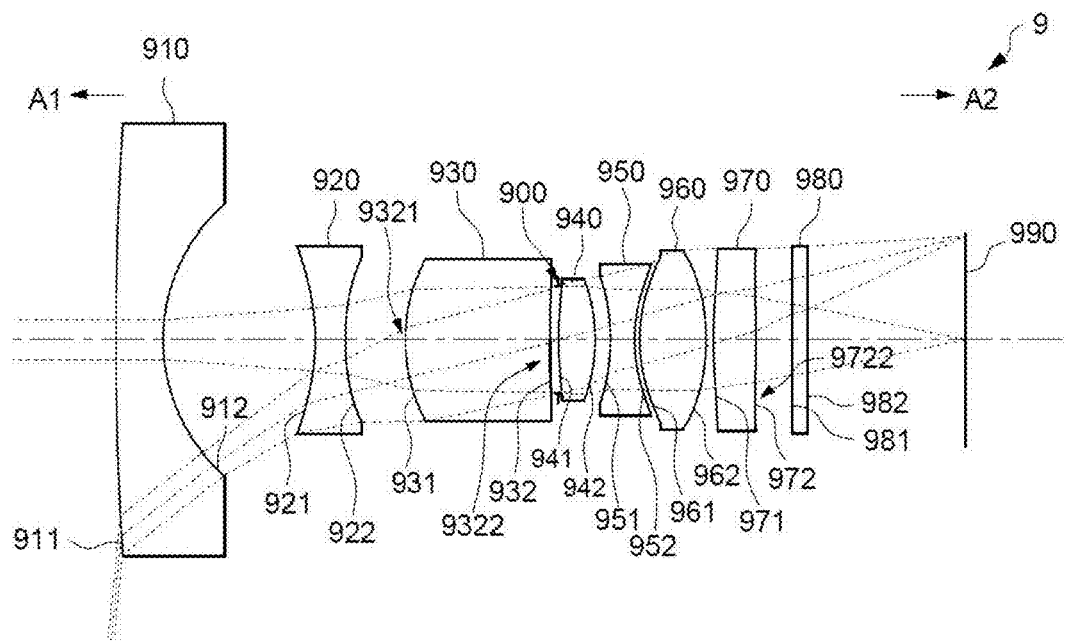
FIG. 38 depicts a cross-sectional view of a ninth embodiment of an optical imaging lens having seven lens elements according to the present disclosure.
Figure 39:
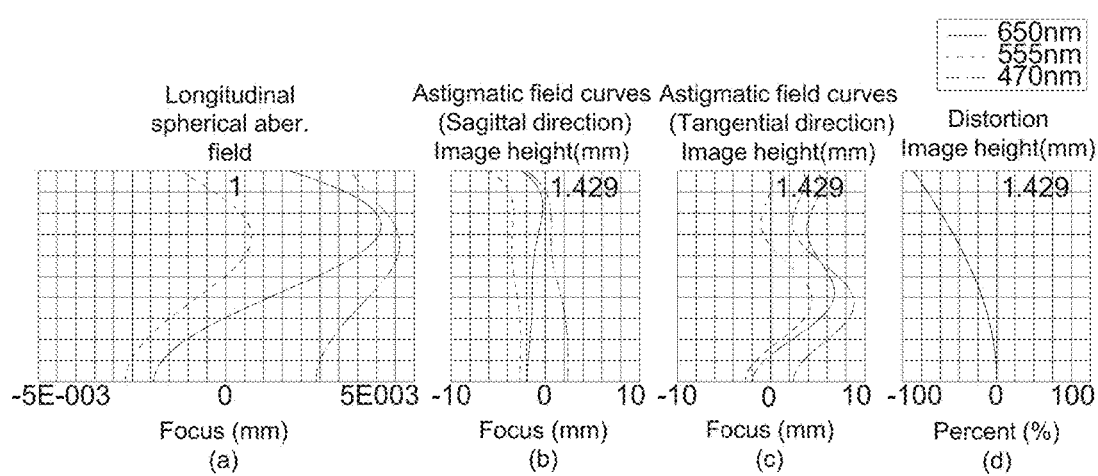
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having seven lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, a third lens element 930, an aperture stop 900, a fourth lens element 940, a fifth lens element 950, a sixth lens element 960 and a seventh lens element 970.

The differences between the ninth embodiment and the eighth embodiment may include the radius of curvature and thickness of each lens element, the distance of each air gap, aspherical data, related optical parameters, such as back focal length, and the configuration of the concave/convex shape of the image-side surfaces 932, 972, but the configuration of the concave/convex shape of surfaces, comprising the object-side surfaces 911, 921, 931, 941, 951, 961, 971 facing to the object side A1 and the image-side surfaces 912, 922, 942, 952, 962 facing to the image side A2, are similar to those in the first embodiment. Specifically, the difference of configuration of surface shape may include: the image-side surface 932 of the third lens element 930 may be a concave surface comprising a concave portion 9321 in a vicinity of the optical axis and a concave portion 9322 in a vicinity of a periphery of the third lens element 930, and the image-side surface 972 of the seventh lens element 970 may comprise a concave portion 9722 in a vicinity of a periphery of the seventh lens element 970. Please refer to FIG. 40 for the optical characteristics of each lens elements in the optical imaging lens 9 of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 39(*a*), the offset of the off-axis light relative to the image point may be within about ±0.005 mm. As the astigmatism aberration in the sagittal direction shown in FIG. 39(*b*), the focus variation with regard to the three wavelengths in the whole field may fall within about ±6 mm. As the astigmatism aberration in the tangential direction shown in FIG. 39(*c*), the focus variation with regard to the three wavelengths in the whole field may fall within about ±10 mm. As shown in FIG. 39(*d*), the variation of the distortion aberration may be within about ±100%. Compared with the eighth embodiment, the longitudinal spherical aberration of the optical imaging lens 9 is less.

According to the value of the aberrations, it is shown that the optical imaging lens 9 of the present embodiment, with the length as short as about 11.673 mm, which is shorter than what is shown in the eighth embodiment, may be capable of providing good imaging quality. Further, with the assumption that the focal shift is set as 0 mm at a reference temperature, 20° C., the focal shift of the optical imaging lens 9 of the present embodiment at about 50° C. may only be about −0.01 mm. One of ordinary skill in the art having the benefit of the present disclosure would appreciate that such an embodiment exhibits desirable and advantageous thermal stability.

Figure 42:
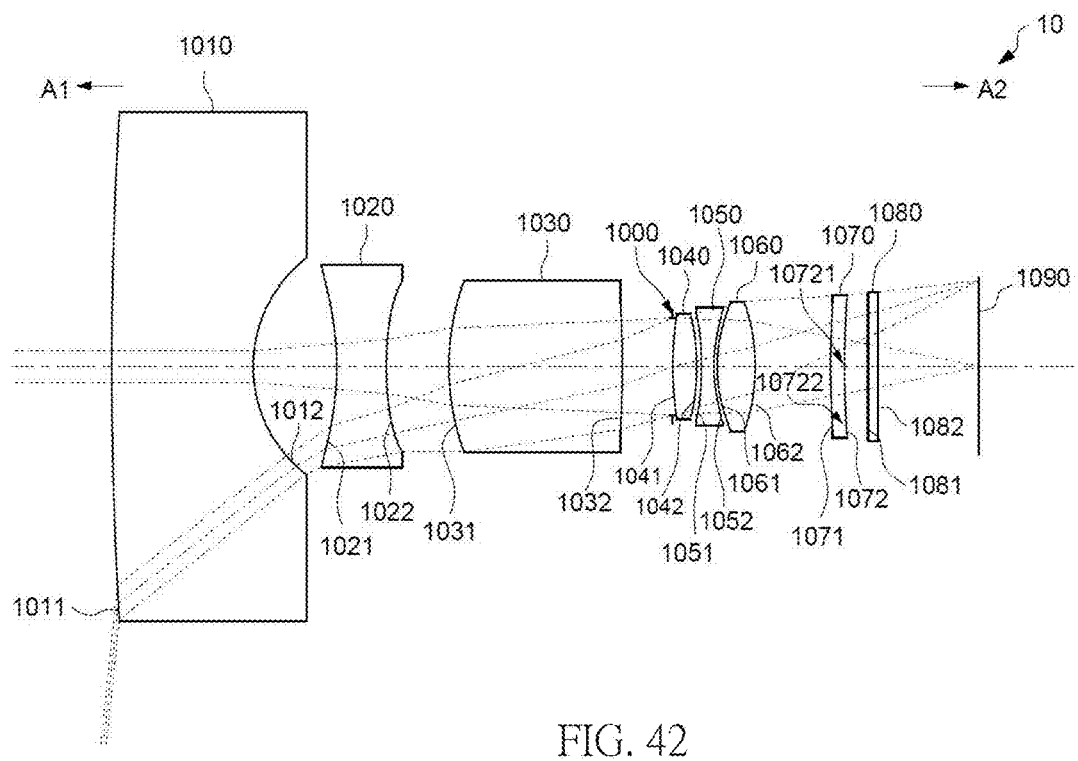
FIG. 42 depicts a cross-sectional view of a tenth embodiment of an optical imaging lens having seven lens elements according to the present disclosure.
Figure 43:
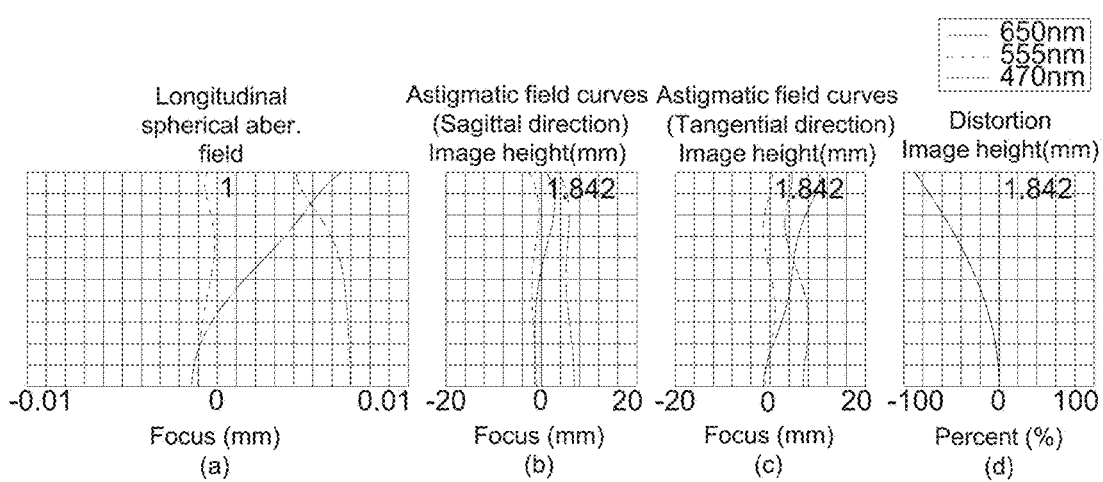
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having seven lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, a second lens element 1020, a third lens element 1030, an aperture stop 1000, a fourth lens element 1040, a fifth lens element 1050, a sixth lens element 1060 and a seventh lens element 1070.

The differences between the tenth embodiment and the eighth embodiment may include the radius of curvature and thickness of each lens element, the distance of each air gap, aspherical data, related optical parameters, such as back focal length, and the configuration of the concave/convex shape of the image-side surface 1072, but the configuration of the concave/convex shape of surfaces, comprising the object-side surfaces 1011, 1021, 1031, 1041, 1051, 1061, 1071 facing to the object side A1 and the image-side surfaces 1012, 1022, 1032, 1042, 1052, 1062 facing to the image side A2, are similar to those in the first embodiment. Specifically, the differences of configuration of surface shape may include: the image-side surface 1072 of the seventh lens element 1070 may be a concave surface comprising a concave portion 10721 in a vicinity of the optical axis and a concave portion 10722 in a vicinity of a periphery of the seventh lens element 1070. Please refer to FIG. 44 for the optical characteristics of each lens elements in the optical imaging lens 10 of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 43(a), the offset of the off-axis light relative to the image point may be within about ±0.01 mm. As the astigmatism aberration in the sagittal direction shown in FIG. 43(b), the focus variation with regard to the three wavelengths in the whole field may fall within about ±8 mm. As the astigmatism aberration in the tangential direction shown in FIG. 43(c), the focus variation with regard to the three wavelengths in the whole field may fall within about ±12 mm. As shown in FIG. 43(d), the variation of the distortion aberration may be within about ±100%.

According to the value of the aberrations, it is shown that the optical imaging lens 10 of the present embodiment, with the length as short as about 18.595 mm, which is shorter than what is shown in the eighth embodiment, may be capable of providing good imaging quality. Further, with the assumption that the focal shift is set as 0 mm at a reference temperature, 20° C., the focal shift of the optical imaging lens 10 of the present embodiment at about 50° C. may only be about −0.007 mm. One of ordinary skill in the art having the benefit of the present disclosure would appreciate that such an embodiment exhibits desirable and advantageous thermal stability.

Figure 46:
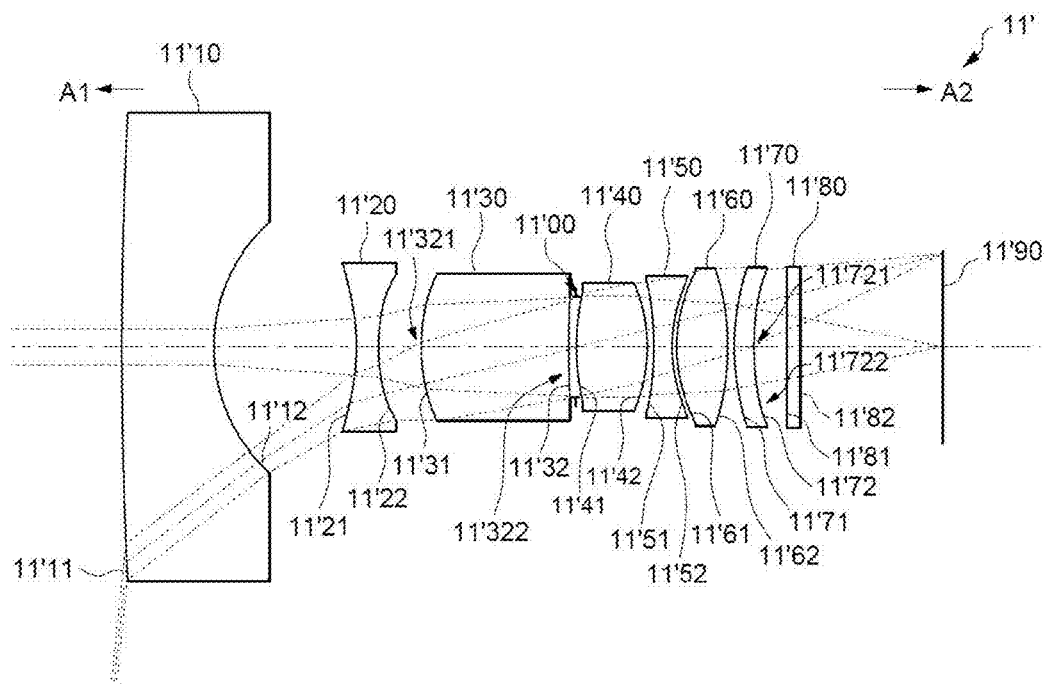
FIG. 46 depicts a cross-sectional view of an eleventh embodiment of an optical imaging lens having seven lens elements according to the present disclosure.
Figure 47:
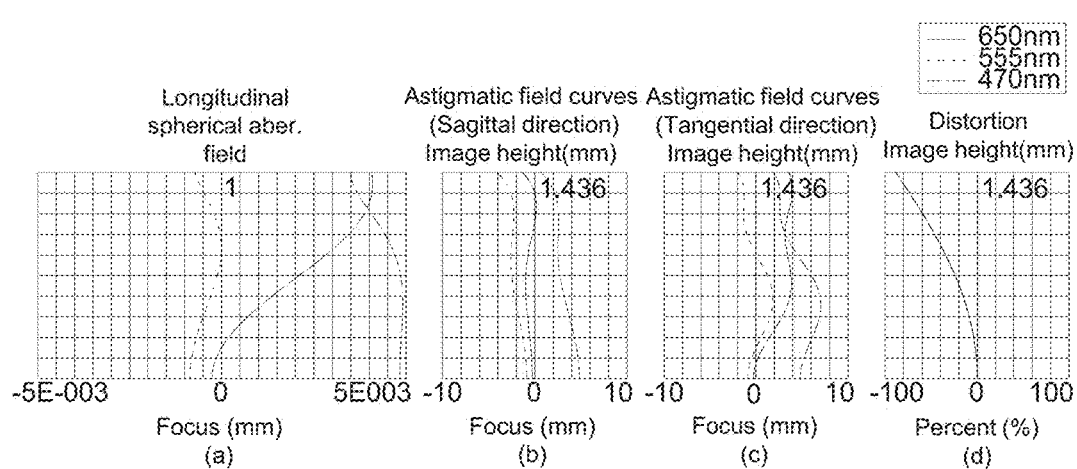
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11' having seven lens elements of the optical imaging lens according to an eleventh example embodiment. FIG. 47 shows example charts of longitudinal spherical aberration and other kinds of optical aberrations of the optical imaging lens 11' according to the eleventh embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment are similar to those in the first embodiment for the similar elements, but here the reference numbers are initialed with 11', for example, reference number 11'31 for labeling the object-side surface of the third lens element 11'30, reference number 11'32 for labeling the image-side surface of the third lens element 11'30, etc.

As shown in FIG. 38, the optical imaging lens 11' of the present embodiment, in an order from an object side A1 to an image side A2 along an optical axis, may comprise a first lens element 11'10, a second lens element 11'20, a third lens element 11'30, an aperture stop 11'00, a fourth lens element 11'40, a fifth lens element 11'50, a sixth lens element 11'60 and a seventh lens element 11'70.

The differences between the eleventh embodiment and the eighth embodiment may include the radius of curvature and thickness of each lens element, the distance of each air gap, aspherical data, related optical parameters, such as back focal length, and the configuration of the concave/convex shape of the image-side surfaces 11'32, 11'72, but the configuration of the concave/convex shape of surfaces, comprising the object-side surfaces 11'11, 11'21, 11'31, 11'41, 11'51, 11'61, 11'71 facing to the object side A1 and the image-side surfaces 11'12, 11'22, 11'42, 11'52, 11'62 facing to the image side A2, are similar to those in the first embodiment. Specifically, the difference of configuration of surface shape may include: the image-side surface 11'32 of the third lens element 11'30 may be a concave surface comprising a concave portion 11'321 in a vicinity of the optical axis and a concave portion 11'322 in a vicinity of a periphery of the third lens element 11'30, and the image-side surface 11'72 of the seventh lens element 11'70 may be a concave surface comprising a concave portion 11'721 in a vicinity of the optical axis and a concave portion 11'722 in a vicinity of a periphery of the seventh lens element 11'70. Please refer to FIG. 48 for the optical characteristics of each lens elements in the optical imaging lens 11' of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 47(a), the offset of the off-axis light relative to the image point may be within about ±0.005 mm. As the astigmatism aberration in the sagittal direction shown in FIG. 47(b), the focus variation with regard to the three wavelengths in the whole field may fall within about ±6 mm. As the astigmatism aberration in the tangential direction shown in FIG. 47(c), the focus variation with regard to the three wavelengths in the whole field may fall within about ±8 mm. As shown in FIG. 47(d), the variation of the distortion aberration may be within about ±100%. Compared with the eighth embodiment, the longitudinal spherical aberration of the optical imaging lens 11' is less.

According to the value of the aberrations, it is shown that the optical imaging lens 11' of the present embodiment, with the length as short as about 12.544 mm, which is shorter than what is shown in the eighth embodiment, may be capable of providing good imaging quality. Further, with the assumption that the focal shift is set as 0 mm at a reference temperature, 20° C., the focal shift of the optical imaging lens 11' of the present embodiment at about 50° C. may only be about −0.019 mm. One of ordinary skill in the art having the benefit of the present disclosure would appreciate that such an embodiment exhibits desirable and advantageous thermal stability.

Figure 50:
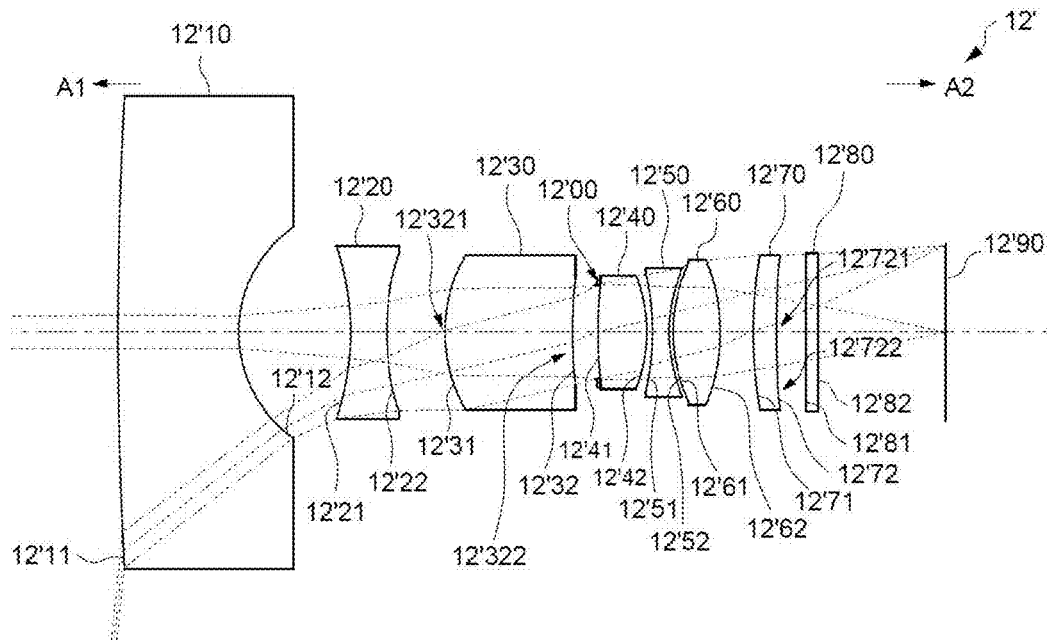
FIG. 50 depicts a cross-sectional view of a twelfth embodiment of an optical imaging lens having seven lens elements according to the present disclosure.
Figure 51:
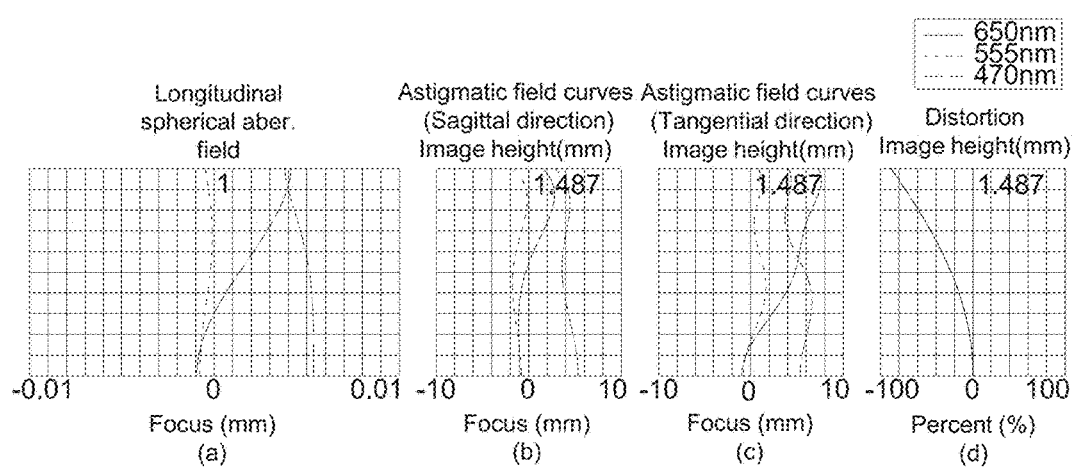
FIG. 51 depicts a chart of longitudinal spherical aberration and other kinds of optical aberrations of a twelfth embodiment of the optical imaging lens according to the present disclosure.

Reference is now made to FIGS. 50-53. FIG. 50 illustrates an example cross-sectional view of an optical imaging lens 12' having seven lens elements of the optical imaging lens 12' according to an twelfth example embodiment. FIG. 51 shows example charts of longitudinal spherical aberration and other kinds of optical aberrations of the optical imaging lens 12' according to the twelfth embodiment. FIG. 52 shows an example table of optical data of each lens element of the optical imaging lens 12' according to the twelfth example embodiment. FIG. 53 shows an example table of aspherical data of the optical imaging lens 12' according to the twelfth example embodiment. The reference numbers labeled in the present embodiment are similar to those in the first embodiment for the similar elements, but here the reference numbers are initialed with 12', for example, reference number 12'31 for labeling the object-side surface of the third lens element 12'30, reference number 12'32 for labeling the image-side surface of the third lens element 12'30, etc.

As shown in FIG. 50, the optical imaging lens 12' of the present embodiment, in an order from an object side A1 to an image side A2 along an optical axis, may comprise a first lens element 12'10, a second lens element 12'20, a third lens element 12'30, an aperture stop 12'00, a fourth lens element 12'40, a fifth lens element 12'50, a sixth lens element 12'60 and a seventh lens element 12'70.

The differences between the twelfth embodiment and the eighth embodiment may include the radius of curvature and thickness of each lens element, the distance of each air gap, aspherical data, related optical parameters, such as back focal length, and the configuration of the concave/convex shape of the image-side surfaces 12'32, 12'72, but the configuration of the concave/convex shape of surfaces, comprising the object-side surfaces 12'11, 12'21, 12'31, 12'41, 12'51, 12'61, 12'71 facing to the object side A1 and the image-side surfaces 12'12, 12'22, 12'42, 12'52, 12'62 facing to the image side A2, are similar to those in the first embodiment. Specifically, the difference of configuration of surface shape may include: the image-side surface 12'32 of the third lens element 12'30 may be a concave surface comprising a concave portion 12'321 in a vicinity of the optical axis and a concave portion 12'322 in a vicinity of a periphery of the third lens element 12'30, and the image-side surface 12'72 of the seventh lens element 12'70 may be a concave surface comprising a concave portion 12'721 in a vicinity of the optical axis and a concave portion 12722 in a vicinity of a periphery of the seventh lens element 1270. Please refer to FIG. 52 for the optical characteristics of each lens elements in the optical imaging lens 12' of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 51(a), the offset of the off-axis light relative to the image point may be within about ±0.006 mm. As the astigmatism aberration in the sagittal direction shown in FIG. 51(b), the focus variation with regard to the three wavelengths in the whole field may fall within about ±6 mm. As the astigmatism aberration in the tangential direction shown in FIG. 51(c), the focus variation with regard to the three wavelengths in the whole field may fall within about ±8 mm. As shown in FIG. 51(d), the variation of the distortion aberration may be within about ±100%. Compared with the eighth embodiment, the longitudinal spherical aberration of the optical imaging lens 12' is less.

According to the value of the aberrations, it is shown that the optical imaging lens 12' of the present embodiment, with the length as short as about 14.115 mm, which is shorter than what is shown in the eighth embodiment, may be capable of providing good imaging quality. Further, with the assumption that the focal shift is set as 0 mm at a reference temperature, 20° C., the focal shift of the optical imaging lens 12' of the present embodiment at about 50° C. may only be about −0.009 mm. One of ordinary skill in the art having the benefit of the present disclosure would appreciate that such an embodiment exhibits desirable and advantageous thermal stability.

Figure 54:
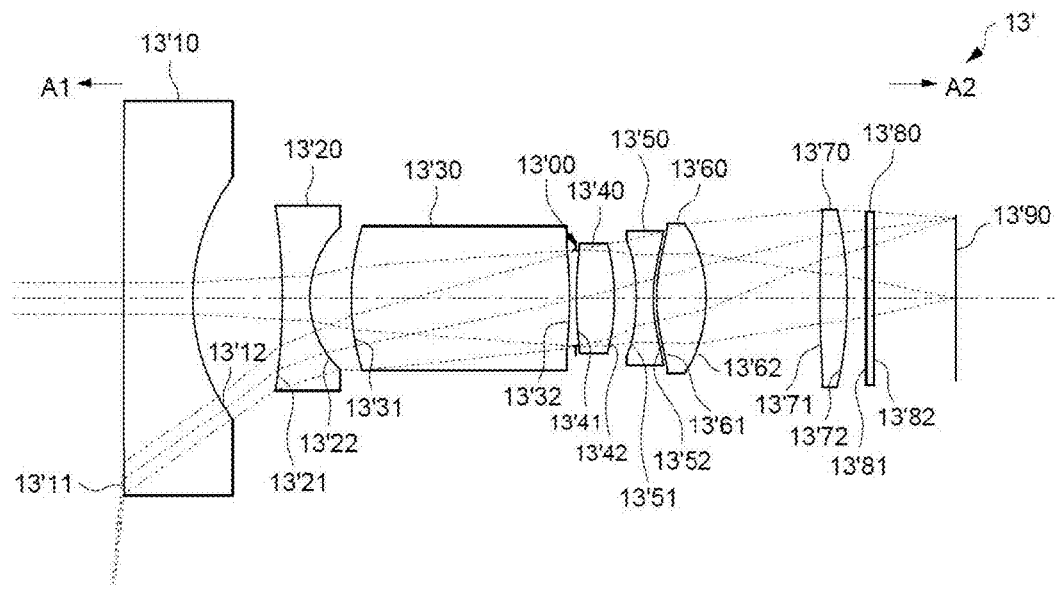
FIG. 54 depicts a cross-sectional view of a thirteenth embodiment of an optical imaging lens having seven lens elements according to the present disclosure.
Figure 55:
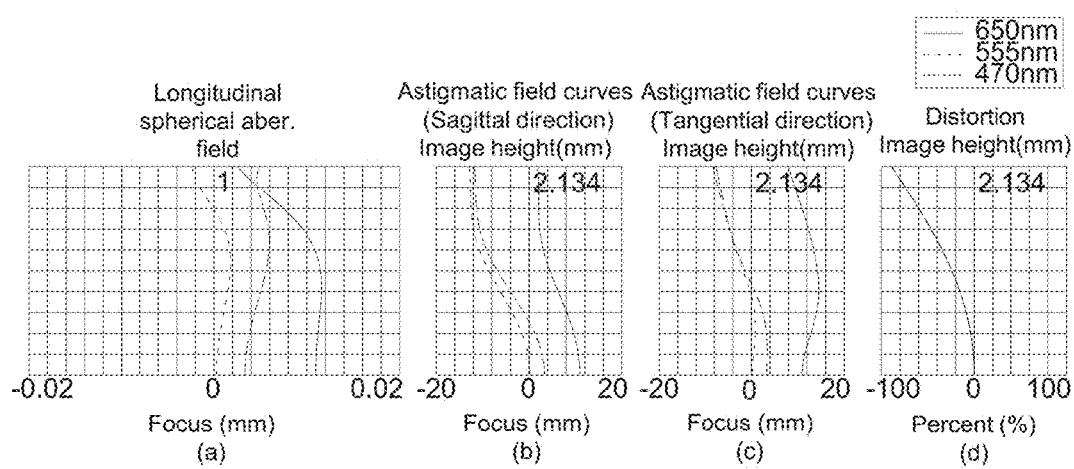
FIG. 55 depicts a chart of longitudinal spherical aberration and other kinds of optical aberrations of a thirteenth embodiment of the optical imaging lens according to the present disclosure.

Reference is now made to FIGS. 54-57. FIG. 54 illustrates an example cross-sectional view of an optical imaging lens 13' having seven lens elements of the optical imaging lens according to an thirteenth example embodiment. FIG. 55 shows example charts of longitudinal spherical aberration and other kinds of optical aberrations of the optical imaging lens 13' according to the thirteenth embodiment. FIG. 56 shows an example table of optical data of each lens element of the optical imaging lens 13' according to the thirteenth example embodiment. FIG. 57 shows an example table of aspherical data of the optical imaging lens 13' according to the thirteenth example embodiment. The reference numbers labeled in the present embodiment are similar to those in the first embodiment for the similar elements, but here the reference numbers are initialed with 13', for example, reference number 13'31 for labeling the object-side surface of the third lens element 13'30, reference number 13'32 for labeling the image-side surface of the third lens element 13'30, etc.

As shown in FIG. 54, the optical imaging lens 13' of the present embodiment, in an order from an object side A1 to an image side A2 along an optical axis, may comprise a first lens element 13'10, a second lens element 13'20, a third lens element 13'30, an aperture stop 13'00, a fourth lens element 13'40, a fifth lens element 13'50, a sixth lens element 13'60 and a seventh lens element 13'70.

The differences between the thirteenth embodiment and the eighth embodiment may include the radius of curvature and thickness of each lens element, the distance of each air gap, aspherical data and related optical parameters, such as back focal length, but the configuration of the concave/convex shape of surfaces, comprising the object-side surfaces 13'11, 13'21, 13'31, 13'41, 13'51, 13'61, 13'71 facing to the object side A1 and the image-side surfaces 13'12, 13'22, 13'32, 13'42, 13'52, 13'62, 13'72 facing to the image side A2, are similar to those in the first embodiment. Please refer to FIG. 56 for the optical characteristics of each lens elements in the optical imaging lens 13' of the present embodiment, please refer to FIG. 58B for the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of the present embodiment.

As the longitudinal spherical aberration shown in FIG. 55(a), the offset of the off-axis light relative to the image point may be within about ±0.012 mm. As the astigmatism aberration in the sagittal direction shown in FIG. 55(b), the focus variation with regard to the three wavelengths in the whole field may fall within about ±16 mm. As the astigmatism aberration in the tangential direction shown in FIG. 55(c), the focus variation with regard to the three wavelengths in the whole field may fall within about ±16 mm. As shown in FIG. 55(d), the variation of the distortion aberration may be within about ±100%.

According to the value of the aberrations, it is shown that the optical imaging lens 13' of the present embodiment, with the length as short as about 22.099 mm, which is shorter than what is shown in the eighth embodiment, may be capable of providing good imaging quality. Further, with the assumption that the focal shift is set as 0 mm at a reference temperature, 20° C., the focal shift of the optical imaging lens 13' of the present embodiment at about 50° C. may only be about −0.01 mm. One of ordinary skill in the art having the benefit of the present disclosure would appreciate that such an embodiment exhibits desirable and advantageous thermal stability.

Please refer to FIGS. 58A and 58B, which show the values of Tmax/Tmin, T3/T2, TTL/(T1+T2), (T1+T4)/EFL, (G12+G23)/T1, T3/(G23+G34), (G12+G34)/EFL, (T2+T3)/T4, (T1+T2+T3)/(G12+G23+G34), TTL/(T3+T4), (T1+G12)/(T2+G23), Tmax/(G12+G34), EFL/Tmin, T1/T4, (G12+G23)/(T2+T4), TTL/EFL, TTL/Tmax, (G23+G34)/T2 and (T3+T4)/EFL of all thirteen embodiments, and it is clear that the optical imaging lens of the present disclosure satisfy the inequality (1) and/or inequalities (2)~(19). Further, any range which upper and lower limits defined by the values discloses in all of the embodiments shown here may be implemented in the present invention.

According to above illustration, the longitudinal spherical aberration, astigmatism aberration both in the sagittal direction and tangential direction and distortion aberration in all embodiments are meet user term of a related product in the market. The off-axis light with regard to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein. Further, all of the numerical ranges including the maximum and minimum values and the values therebetween which are obtained from the combining proportion relation of the optical parameters disclosed in each embodiment of the invention are implementable.

What is claimed is:

1. An optical imaging lens, comprising at least first, second, third, fourth, fifth and sixth lens elements as six frontmost lens elements having refracting power arranged sequentially in ascending order from an object side to an image side along an optical axis, each of the first, second, third, fourth, fifth and sixth lens elements having an object-side surface facing toward the object side and allowing imaging rays to pass through and an image-side surface facing toward the image side and allowing the imaging rays to pass through, wherein:

the first lens element has negative refracting power;

the object-side surface of the second lens element comprises a concave portion in a vicinity of the optical axis, and the image-side surface of the second lens element comprises a concave portion in a vicinity of the optical axis;

the image-side surface of the forth lens element comprises a convex portion in a vicinity of a periphery of the fourth lens element;

the object-side surface of the fifth lens element comprises a concave portion in a vicinity of the optical axis;

the object-side surface of the sixth lens element comprises a convex portion in a vicinity of the optical axis, and the image-side surface of the sixth lens element comprises a convex portion in a vicinity of a periphery of the sixth lens element; and a maximum central thickness of a lens element having refracting power among all lens elements is represented by Tmax, a minimum central thickness of a lens element having refracting power among all lens elements is represented by Tmin, and Tmax and Tmin satisfy the inequality:

$T\max/T\min \geq 6.0$, wherein a central thickness of the first lens element along the optical axis is represented by T1, a central thickness of the fourth lens element along the optical axis is represented by T4, and T4 and T1 satisfy the inequality:

$T1/T4 \geq 1.3$.

2. The optical imaging lens according to claim 1, wherein a central thickness of the third lens element along the optical axis is represented by T3, a central thickness of the second lens element along the optical axis is represented by T2, and T3 and T2 satisfy the inequality:

$T3/T2 \geq 3.5$.

3. The optical imaging lens according to claim 1, wherein a distance between the object-side surface of the first lens element and an image plane along the optical axis is represented by TTL, a central thickness of the second lens element along the optical axis is represented by T2, and TTL, T1 and T2 satisfy the inequality:

$TTL/(T1+T2) \leq 11.0$.

4. The optical imaging lens according to claim 1, wherein an effective focal length of the optical imaging lens is represented by EFL, and T1, T4 and EFL satisfy the inequality:

(T1+T4)/EFL≤2.1.

5. The optical imaging lens according to claim 1, wherein an air gap between the first lens element and the second lens element along the optical axis is represented by G12, an air gap between the second lens element and the third lens element along the optical axis is represented by G23, and G12, G23 and T1 satisfy the inequality:

(G12+G23)/T1≤4.5.

6. The optical imaging lens according to claim 1, wherein a central thickness of the third lens element along the optical axis is represented by T3, an air gap between the second lens element and the third lens element along the optical axis is represented by G23, an air gap between the third lens element and the fourth lens element along the optical axis is represented by G34, and T3, G23 and G34 satisfy the inequality:

T3/(G23+G34)≥1.4.

7. The optical imaging lens according to claim 1, wherein an air gap between the first lens element and the second lens element along the optical axis is represented by G12, an air gap between the third lens element and the fourth lens element along the optical axis is represented by G34, an effective focal length of the optical imaging lens is represented by EFL, and G12, G34 and EFL satisfy the inequality:

(G12+G34)/EFL≤1.7.

8. The optical imaging lens according to claim 1, wherein a central thickness of the second lens element along the optical axis is represented by T2, a central thickness of the third lens element along the optical axis is represented by T3, and T2, T3 and T4 satisfy the inequality:

(T2+T3)/T4≥2.4.

9. The optical imaging lens according to claim 1, wherein a central thickness of the second lens element along the optical axis is represented by T2, a central thickness of the third lens element along the optical axis is represented by T3, an air gap between the first lens element and the second lens element along the optical axis is represented by G12, an air gap between the second lens element and the third lens element along the optical axis is represented by G23, an air gap between the third lens element and the fourth lens element along the optical axis is represented by G34, and T1, T2, T3, G12, G23 and G34 satisfy the inequality:

(T1+T2+T3)/(G12+G23+G34)≥1.0.

10. The optical imaging lens according to claim 1, wherein a distance between the object-side surface of the first lens element and an image plane along the optical axis is represented by TTL, a central thickness of the third lens element along the optical axis is represented by T3, and TTL, T3 and T4 satisfy the inequality:

TTL/(T3+T4)≤4.7.

11. The optical imaging lens according to claim 1, wherein an air gap between the first lens element and the second lens element along the optical axis is represented by G12, a central thickness of the second lens element along the optical axis is represented by T2, an air gap between the second lens element and the third lens element along the optical axis is represented by G23, and T1, G12, T2 and G23 satisfy the inequality:

(T1+G12)/(T2+G23)≥2.0.

12. The optical imaging lens according to claim 1, wherein an air gap between the first lens element and the second lens element along the optical axis is represented by G12, an air gap between the third lens element and the fourth lens element along the optical axis is represented by G34, and Tmax, G12 and G34 satisfy the inequality:

Tmax/(G12+G34)≥0.9.

13. The optical imaging lens according to claim 1, wherein an effective focal length of the optical imaging lens is represented by EFL, and EFL and Tmin satisfy the inequality:

EFL/Tmin≥3.5.

14. The optical imaging lens according to claim 1, wherein an air gap between the first lens element and the second lens element along the optical axis is represented by G12, an air gap between the second lens element and the third lens element along the optical axis is represented by G23, a central thickness of the second lens element along the optical axis is represented by T2, and G12, G23, T2 and T4 satisfy the inequality:

(G12+G23)/(T2+T4)≥2.0.

15. The optical imaging lens according to claim 1, wherein a distance between the object-side surface of the first lens element and an image plane along the optical axis is represented by TTL, an effective focal length of the optical imaging lens is represented by EFL, and TTL and EFL satisfy the inequality:

TTL/EFL≤11.0.

16. The optical imaging lens according to claim 1, wherein a distance between the object-side surface of the first lens element and an image plane along the optical axis is represented by TTL, and TTL and Tmax satisfy the inequality:

TTL/Tmax≤6.5.

17. The optical imaging lens according to claim 1, wherein an air gap between the second lens element and the third lens element along the optical axis is represented by G23, an air gap between the third lens element and the fourth lens element along the optical axis is represented by G34, a central thickness of the second lens element along the optical axis is represented by T2, and G23, G34 and T2 satisfy the inequality:

(G23+G34)/T2≤2.4.

18. The optical imaging lens according to claim 1, wherein a central thickness of the third lens element along the optical axis is represented by T3, an effective focal length of the optical imaging lens is represented by EFL, and T3, T4 and EFL satisfy the inequality:

(T3+T4)/EFL≤3.4.

19. The optical imaging lens according to claim 1, wherein at least two lens elements of the at least first, second, third, fourth, fifth and sixth lens elements are glass lens elements.

* * * * *